United States Patent
Yamamoto et al.

(10) Patent No.: US 12,278,865 B2
(45) Date of Patent: Apr. 15, 2025

(54) RELAY DEVICE, IN-VEHICLE COMMUNICATION SYSTEM, VEHICLE, AND IN-VEHICLE COMMUNICATION METHOD

(71) Applicants: Sumitomo Electric Industries, Ltd., Osaka (JP); Sumitomo Wiring Systems, Ltd., Yokkaichi (JP); Autonetworks Technologies, Ltd., Yokkaichi (JP)

(72) Inventors: Yusuke Yamamoto, Osaka (JP); Hideyuki Tanaka, Osaka (JP); Tatsuya Izumi, Osaka (JP); Takeshi Hagihara, Yokkaichi (JP); Darmawan Go, Yokkaichi (JP)

(73) Assignees: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

( * ) Notice: Subject to any disclaimer, the term of this patent is extended or adjusted under 35 U.S.C. 154(b) by 243 days.

(21) Appl. No.: 17/770,062

(22) PCT Filed: Sep. 10, 2020

(86) PCT No.: PCT/JP2020/034306
§ 371 (c)(1),
(2) Date: Apr. 19, 2022

(87) PCT Pub. No.: WO2021/084929
PCT Pub. Date: May 6, 2021

(65) Prior Publication Data
US 2022/0377142 A1 Nov. 24, 2022

(30) Foreign Application Priority Data

Oct. 28, 2019 (JP) .................. 2019-195298

(51) Int. Cl.
*H04L 67/12* (2022.01)
*H04L 45/00* (2022.01)
*H04W 4/02* (2018.01)

(52) U.S. Cl.
CPC .............. *H04L 67/12* (2013.01); *H04L 45/66* (2013.01); *H04W 4/025* (2013.01)

(58) Field of Classification Search
CPC ................... H04L 67/12; H04L 45/66; H04L 2012/40234; H04L 2012/40241;
(Continued)

(56) References Cited

U.S. PATENT DOCUMENTS

2010/0215043 A1   8/2010  Hisada
2013/0136117 A1*  5/2013  Schrum, Jr. ............. H04L 45/66
                                                        370/338
(Continued)

FOREIGN PATENT DOCUMENTS

CN       110073427 A    7/2019
CN       110089086 A    8/2019
(Continued)

OTHER PUBLICATIONS

U.S. Office Action issued Feb. 9, 2023 in U.S. Appl. No. 17/770,060, 19 pages.
(Continued)

*Primary Examiner* — Shah M Rahman
(74) *Attorney, Agent, or Firm* — XSENSUS LLP

(57) ABSTRACT

Provided is a relay device including: a relay unit configured to perform a relay process for a frame transmitted and received between a plurality of function units; and a relay
(Continued)

management unit. The relay unit receives, from a function unit, a target frame. When a content of the target frame satisfies a predetermined condition, the relay management unit stores, in the target frame, position information which is information regarding a position, in the in-vehicle network, of a function unit as a request source of a service related to the target frame or a function unit as a request destination of the service related to the target frame, and outputs the target frame having the position information stored therein, to the relay unit. The relay unit transmits the target frame received from the relay management unit, to a function unit which is a destination of the target frame.

4 Claims, 15 Drawing Sheets

(58) Field of Classification Search
CPC ... H04L 2012/445; H04L 12/44; H04L 12/40; H04L 2012/40215; H04L 2012/40273; H04W 4/38; H04W 4/025; H04W 4/48; H04W 76/10; H04W 88/04
See application file for complete search history.

(56) References Cited

U.S. PATENT DOCUMENTS

| | | | | |
|---|---|---|---|---|
| 2014/0068099 | A1* | 3/2014 | Komori | H04L 45/745 709/236 |
| 2016/0278017 | A1* | 9/2016 | Koike | H04W 52/0235 |
| 2016/0301545 | A1* | 10/2016 | Koike | H04L 49/111 |
| 2016/0344601 | A1 | 11/2016 | Kaku | |
| 2016/0380790 | A1* | 12/2016 | Kaku | H04L 1/22 370/315 |
| 2017/0214606 | A1 | 7/2017 | Park et al. | |
| 2018/0103108 | A1* | 4/2018 | Kim | H04L 67/12 |
| 2019/0222438 | A1* | 7/2019 | Kaku | H04L 49/208 |
| 2019/0232892 | A1* | 8/2019 | Moriya | H04L 12/4625 |
| 2019/0239221 | A1* | 8/2019 | Ujiie | H04L 12/28 |
| 2019/0334897 | A1 | 10/2019 | Anzai et al. | |
| 2020/0021557 | A1* | 1/2020 | Shikata | H04L 45/74 |
| 2020/0106704 | A1* | 4/2020 | Iwata | H04L 12/28 |
| 2020/0145252 | A1 | 5/2020 | Torisaki et al. | |
| 2020/0211301 | A1* | 7/2020 | Zhang | H04L 63/065 |
| 2020/0220838 | A1* | 7/2020 | Ogawa | H04L 12/28 |
| 2020/0304532 | A1* | 9/2020 | Haga | H04L 12/4625 |
| 2020/0389469 | A1 | 12/2020 | Litichever et al. | |
| 2021/0075800 | A1* | 3/2021 | Paraskevas | H04L 63/1441 |
| 2021/0157573 | A1 | 5/2021 | Abe et al. | |
| 2021/0258187 | A1 | 8/2021 | Hiroyuki et al. | |
| 2022/0131842 | A1* | 4/2022 | Zhang | G06F 21/57 |

FOREIGN PATENT DOCUMENTS

| | | | | |
|---|---|---|---|---|
| EP | 3439210 | A1 * | 2/2019 | H04L 1/0061 |
| JP | 2019-9559 | A | 1/2019 | |
| WO | 2018/127790 | A2 | 7/2018 | |

OTHER PUBLICATIONS

English translation of US co-pending US National Phase application of PCT/JP2020/034282.
English translation of US co-pending US National Phase application of PCT/JP2020/034302.
U.S. Notice of Allowance issued Jul. 18, 2023 in U.S. Appl. No. 17/770,060, 7 pages.
Non-Final Office Action dated Aug. 14, 2024, issued for the co-pending U.S. Appl. No. 17/770,064, 33 pages.
Notice of Allowance dated Dec. 6, 2024, issued for the co-pending U.S. Appl. No. 17/770,064, total 13 pages.

* cited by examiner

FIG. 3

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|----|----|----|----|----|----|----|----|----|----|----|----|----|----|----|----|----|----|----|----|----|----|
| Type | | | | | | | | Index 1st options | | | | | | | | Index 2nd options | | | | | | | | # of opt 1 | | | # of opt 2 | | | |
| Service ID | | | | | | | | | | | | | | | | Instance ID | | | | | | | | | | | | | | | |
| Major Version | | | | | | | | Initial Data Requested Flag | Reserved2 | | | Counter | | | | TTL | | | | | | | | Eventgroup ID | | | | | | | |
| Reserved | | | | | | | | | | | | | | | | | | | | | | | | | | | | | | | |

FIG. 5

| COMMUNICATION PORT | MAC ADDRESS |
|---|---|
| COMMUNICATION PORT 13A | MAC-A |
| COMMUNICATION PORT 13B | – |
| COMMUNICATION PORT 13C | MAC-B |
| COMMUNICATION PORT 13D | – |
| COMMUNICATION PORT 13E | MAC-C |
| COMMUNICATION PORT 13F | MAC-D |

FIG. 7

| PORT | PERMITTED COMMUNICATION PORT/ NON-PERMITTED COMMUNICATION PORT |
|---|---|
| PORT 13A | PERMITTED COMMUNICATION PORT |
| PORT 13B | NON-PERMITTED COMMUNICATION PORT |
| PORT 13C | PERMITTED COMMUNICATION PORT |
| PORT 13D | NON-PERMITTED COMMUNICATION PORT |
| PORT 13E | PERMITTED COMMUNICATION PORT |

RELAY DEVICE, IN-VEHICLE COMMUNICATION SYSTEM, VEHICLE, AND IN-VEHICLE COMMUNICATION METHOD

CROSS-REFERENCE TO RELATED APPLICATIONS

The present application is based on PCT/JP2020/034306, filed on Sep. 10, 2020, which claims priority to Japanese Application No. 2019-195298, filed on Oct. 28, 2019. This application is also related to U.S. Pat. No.; 17,770,060, entitled: RELAY DEVICE, IN-VEHICLE COMMUNICATION SYSTEM, VEHICLE, AND IN-VEHICLE COMMUNICATION METHOD, filed Apr. 19, 2022 and U.S. Pat. No.; 17,770,064, entitled: RELAY DEVICE, IN-VEHICLE COMMUNICATION SYSTEM, IN-VEHICLE COMMUNICATION METHOD, AND STORAGE MEDIUM, filed Apr. 19, 2022. The entire contents of each are incorporated herein by reference.

TECHNICAL FIELD

The present disclosure relates to a relay device, an in-vehicle communication system, a vehicle, and an in-vehicle communication method.

BACKGROUND ART

PATENT LITERATURE 1 (Japanese Laid-Open Patent Publication No. 2019-9559) discloses a server as follows. That is, the server is a server (20) which is applied to a communication system (10) using a TCP/IP communication protocol, and provides services to clients (40 to 44, 50 to 54) according to subscription requests of the clients. The server (20) includes: a table storage unit (30) configured to store therein a priority table (32) in which, for each service, a priority level in receiving the service is set in association with each client; and a service determination unit (26, S400 to S410) configured to, when a client requests subscription of a service, determine whether or not to permit the service subscription request from the client on the basis of the priority table stored in the table storage unit.

CITATION LIST

Patent Literature

PATENT LITERATURE 1: Japanese Laid-Open Patent Publication No. 2019-9559

SUMMARY OF THE INVENTION

A relay device according to the present disclosure is used in an in-vehicle network including a plurality of function units, and includes: a relay unit configured to perform a relay process for a frame transmitted and received between the function units; and a relay management unit. The relay unit receives, from a function unit, a target frame which is transmitted and received according to a predetermined communication protocol and includes information with which a request source of a service is identifiable and information with which a content of the requested service is identifiable, and outputs the received target frame to the relay management unit. When a content of the target frame received from the relay unit satisfies a predetermined condition, the relay management unit stores, in the target frame, position information which is information regarding a position, in the in-vehicle network, of a function unit as a request source of a service related to the target frame or a function unit as a request destination of the service related to the target frame, and outputs the target frame having the position information stored therein, to the relay unit. The relay unit transmits the target frame received from the relay management unit, to a function unit which is a destination of the target frame.

An in-vehicle communication system according to the present disclosure includes: a plurality of function units; and a relay device configured to perform a relay process for a frame transmitted and received between the function units in an in-vehicle network. Each function unit transmits, to the relay device, a target frame which is transmitted and received according to a predetermined communication protocol and includes information with which a request source of a service is identifiable and information with which a content of the requested service is identifiable. When a content of the target frame received from the function unit satisfies a predetermined condition, the relay device stores, in the target frame, position information which is information regarding a position, in the in-vehicle network, of a function unit as a request source of a service related to the target frame or a function unit as a request destination of the service related to the target frame, and transmits the target frame having the position information stored therein, to another function unit different from the function unit that has transmitted the target frame to the relay device. The other function unit determines whether or not to perform a process for a service related to the target frame, on the basis of the position information stored in the target frame received from the relay device.

An in-vehicle communication method according to the present disclosure is performed by a relay device which is used in an in-vehicle network including a plurality of function units and performs a relay process for a frame transmitted and received between the function units, and the method includes: receiving, from a function unit, a target frame which is transmitted and received according to a predetermined communication protocol, and includes information with which a request source of a service is identifiable and information with which a content of the requested service is identifiable; when a content of the received target frame satisfies a predetermined condition, storing, in the target frame, position information which is information regarding a position, in the in-vehicle network, of a function unit as a request source of a service related to the target frame or a function unit as a request destination of the service related to the target frame; and transmitting the target frame having the position information stored therein, to a function unit which is a destination of the target frame.

An in-vehicle communication method according to the present disclosure is used in an in-vehicle communication system including a plurality of function units and a relay unit which performs a relay process for a frame transmitted and received between the function units in an in-vehicle network, and the method includes: transmitting a target frame from a function unit to the relay device, the target frame being transmitted and received according to a predetermined communication protocol, and including information with which a request source of a service is identifiable and information with which a content of the requested service is identifiable; when a content of the target frame received from the function unit satisfies a predetermined condition, storing, by the relay device, position information in the target frame, the position information being information regarding a position, in the in-vehicle network, of a function unit as a request source of a service related to the target frame or a function unit as a request destination of the service related to the target frame, and transmitting, by the relay device, the target frame having the position information stored therein, to another function unit different from the function unit that has transmitted the target frame to the relay device; and determining, by the other function unit, whether or not to perform a process for a service related to the target frame, on the basis of the position information stored in the target frame received from the relay device.

One mode of the present disclosure can be realized not only as a relay device including such characteristic processing units, but also as a semiconductor integrated circuit that realizes a part or the entirety of the relay device or as a program that causes a computer to execute process steps in the relay device. Moreover, one mode of the present disclosure can be realized not only as an in-vehicle communication system including such characteristic processing units, but also as a method that has such characteristic process steps, as a semiconductor integrated circuit that realizes a part or the entirety of the in-vehicle communication system, or as a program that causes a computer to execute process steps in the in-vehicle communication system.

BRIEF DESCRIPTION OF DRAWINGS

FIG. 3 shows an example of a frame transmitted and received by in-vehicle ECUs according to the embodiment of the present disclosure.

FIG. 5 shows an example of an address table in a storage unit of the relay device according to the embodiment of the present disclosure.

FIG. 7 shows an example of an addition permission table in the storage unit of an in-vehicle ECU according to the embodiment of the present disclosure.

DETAILED DESCRIPTION

Figure 1:
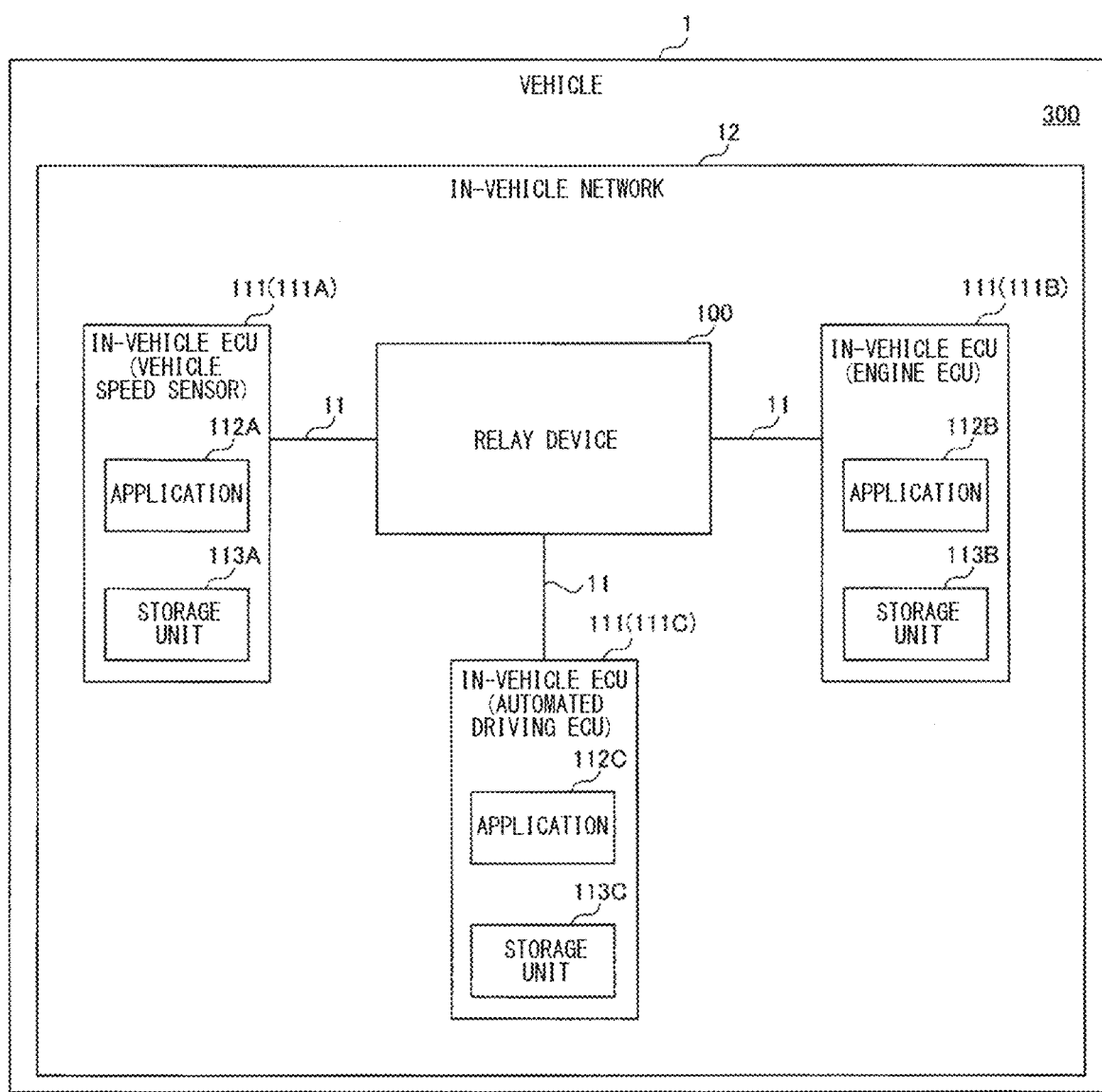
FIG. 1 shows a configuration of an in-vehicle communication system according to an embodiment of the present disclosure.

In recent years, introduction of service-oriented communication into an in-vehicle network has been promoted.

In the conventional art described in PATENT LITERATURE 1, further improvement is desired in terms of efficiency of a frame relay process. Beyond the conventional art, a technology capable of more efficiently performing a relay process in an in-vehicle network is desired.

The present disclosure has been made in order to solve the above problem. An object of the present disclosure is to provide a relay device, an in-vehicle communication system, a vehicle, and an in-vehicle communication method capable of more efficiently performing a relay process in an in-vehicle network.

Effects of the Present Disclosure

According to the present disclosure, a relay process in an in-vehicle network can be performed more efficiently.

DESCRIPTION OF EMBODIMENT OF THE PRESENT DISCLOSURE

First, the contents of an embodiment of the present disclosure are listed and described.

(1) A relay device according to an embodiment of the present disclosure is used in an in-vehicle network including a plurality of function units, and includes: a relay unit configured to perform a relay process for a frame transmitted and received between the function units; and a relay management unit. The relay unit receives, from a function unit, a target frame which is transmitted and received according to a predetermined communication protocol and includes information with which a request source of a service is identifiable and information with which a content of the requested service is identifiable, and outputs the received target frame to the relay management unit. When a content of the target frame received from the relay unit satisfies a predetermined condition, the relay management unit stores, in the target frame, position information which is information regarding a position, in the in-vehicle network, of a function unit as a request source of a service related to the target frame or a function unit as a request destination of the service related to the target frame, and outputs the target frame having the position information stored therein, to the relay unit. The relay unit transmits the target frame received from the relay management unit, to a function unit which is a destination of the target frame.

According to the configuration of transmitting a target frame having position information stored therein to another function unit, on the basis of the position of a function unit, in the in-vehicle network, which has been difficult to be specified in the above communication protocol, it is possible to determine propriety of establishment of communication connection between the function unit and the other function unit, and determine the amount of communication between the function unit and the other function unit. Therefore, the relay process in the in-vehicle network can be efficiently performed.

(2) Preferably, the relay unit outputs, to the relay management unit, place information indicating a reception place of the target frame in the relay device, and the relay management unit stores, in the target frame, the place information received from the relay unit as the position information.

With the above configuration, the function unit having received the target frame can specify the reception place, e.g., a communication port, at which the target frame is received in the relay device having performed the relay process for the target frame, thereby easily grasping the position, in the in-vehicle network, of the function unit as the transmission source of the target frame.

(3) Preferably, the relay management unit stores, in the target frame, identification information of the relay device as the position information.

With the above configuration, for example, in the in-vehicle network including a plurality of relay devices, the function unit having received the target frame can specify the relay device having performed the relay process for the target frame, thereby more accurately grasping the position, in the in-vehicle network, of the function unit as the transmission source of the target frame.

(4) An in-vehicle communication system according to the embodiment of the present disclosure includes: a plurality of function units; and a relay device configured to perform a relay process for a frame transmitted and received between the function units in an in-vehicle network. Each function unit transmits, to the relay device, a target frame which is transmitted and received according to a predetermined communication protocol and includes information with which a request source of a service is identifiable and information with which a content of the requested service is identifiable. When a content of the target frame received from the function unit satisfies a predetermined condition, the relay device stores, in the target frame, position information which is information regarding a position, in the in-vehicle network, of a function unit as a request source of a service related to the target frame or a function unit as a request destination of the service related to the target frame, and transmits the target frame having the position information stored therein, to another function unit different from the function unit that has transmitted the target frame to the relay device. The other function unit determines whether or not to perform a process for a service related to the target frame, on the basis of the position information stored in the target frame received from the relay device.

According to the configuration of transmitting a target frame having position information stored therein to another function unit, on the basis of the position of a function unit, in the in-vehicle network, which has been difficult to be specified in the above communication protocol, it is possible to determine propriety of establishment of communication connection between the function unit and the other function unit, and determine the amount of communication between the function unit and the other function unit. Therefore, the relay process in the in-vehicle network can be efficiently performed.

(5) A vehicle according to the embodiment of the present disclosure includes the in-vehicle communication system.

With the above configuration, in the vehicle including the in-vehicle communication system, the relay process in the in-vehicle network can be performed more efficiently.

(6) An in-vehicle communication method according to the embodiment of the present disclosure is performed by a relay device which is used in an in-vehicle network including a plurality of function units and performs a relay process for a frame transmitted and received between the function units, and the method includes: receiving, from a function unit, a target frame which is transmitted and received according to a predetermined communication protocol, and includes information with which a request source of a service is identifiable and information with which a content of the requested service is identifiable; when a content of the received target frame satisfies a predetermined condition, storing, in the target frame, position information which is information regarding a position, in the in-vehicle network, of a function unit as a request source of a service related to the target frame or a function unit as a request destination of the service related to the target frame; and transmitting the target frame having the position information stored therein, to a function unit which is a destination of the target frame.

According to the method of transmitting a target frame having position information stored therein to another function unit, on the basis of the position of a function unit, in the in-vehicle network, which has been difficult to be specified in the communication protocol, it is possible to determine propriety of establishment of communication connection between the function unit and the other function unit, and determine the amount of communication between the function unit and the other function unit. Therefore, the relay process in the in-vehicle network can be efficiently performed.

(7) An in-vehicle communication method according to the embodiment of the present disclosure is used in an in-vehicle communication system including a plurality of function units and a relay unit which performs a relay process for a frame transmitted and received between the function units in an in-vehicle network, and the method includes: transmitting a target frame from a function unit to the relay device, the target frame being transmitted and received according to a predetermined communication protocol, and including information with which a request source of a service is identifiable and information with which a content of the requested service is identifiable; when a content of the target frame received from the function unit satisfies a predetermined condition, storing, by the relay device, position information in the target frame, the position information being information regarding a position, in the in-vehicle network, of a function unit as a request source of a service related to the target frame or a function unit as a request destination of the service related to the target frame, and transmitting, by the relay device, the target frame having the position information stored therein, to another function unit different from the function unit that has transmitted the target frame to the relay device; and determining, by the other function unit, whether or not to perform a process for a service related to the target frame, on the basis of the position information stored in the target frame received from the relay device.

According to the method of transmitting a target frame having position information stored therein to another function unit, on the basis of the position of a function unit, in the in-vehicle network, which has been difficult to be specified in the communication protocol, it is possible to determine propriety of establishment of communication connection between the function unit and the other function unit, and determine the amount of communication between the function unit and the other function unit. Therefore, the relay process in the in-vehicle network can be efficiently performed.

Hereinafter, an embodiment of the present disclosure will be described in detail with reference to the drawings. In the drawings, the same or corresponding parts are denoted by the same reference signs, and description thereof is not repeated. At least some parts of the embodiments described below can be combined together as desired.

[In-Vehicle Communication System]

FIG. 1 shows a configuration of an in-vehicle communication system according to an embodiment of the present disclosure.

With reference to FIG. 1, an in-vehicle communication system 300 includes a plurality of in-vehicle ECUs (Electronic Control Units) 111, and a relay device 100. Specifically, the in-vehicle communication system 300 includes in-vehicle ECUs 111A to 111C as the in-vehicle ECUs 111. The in-vehicle communication system 300 is installed in a vehicle 1. The in-vehicle ECUs 111 and the relay device 100 constitute an in-vehicle network 12. The relay device 100 is used in the in-vehicle network 12 including the plurality of in-vehicle ECUs 111.

The in-vehicle ECU 111A includes an application 112A and a storage unit 113A. The in-vehicle ECU 111B includes an application 112B and a storage unit 113B. The in-vehicle ECU 111C includes an application 112C and a storage unit 113C. Hereinafter, each of the applications 112A, 112B, and 112C is also referred to as an application 112. Each of the storage units 113A, 113B, and 113C is also referred to as a storage unit 113.

The in-vehicle ECUs 111 and the applications 112 are examples of function units in the in-vehicle network 12.

In the in-vehicle network 12, the in-vehicle ECUs 111 are connected to the relay device 100 via Ethernet (registered trademark) cables 11, for example.

The in-vehicle communication system 300 may not necessarily include three in-vehicle ECUs 111, and may include two, four, or more in-vehicle ECUs 111. The in-vehicle communication system 300 may not necessarily be configured such that one application 112 is installed in one in-vehicle ECU 111, and may be configured such that two or more applications 112 are installed in one in-vehicle ECU 111.

The in-vehicle communication system 300 may not necessarily include one relay device 100, and may include two or more relay devices 100.

The relay device 100 is, for example, a gateway device, and can relay data between a plurality of in-vehicle ECUs 111 connected thereto. The relay device 100 can perform a relay process in accordance with, for example, a layer 2, and a layer 3 of a higher order than the layer 2. For example, the relay device 100 performs a relay process for a frame between in-vehicle ECUs 111 belonging to the same VLAN, and a relay process for a frame between in-vehicle ECUs 111 belonging to different VLANs.

More specifically, the relay device 100 performs a relay process for a frame to be exchanged between the in-vehicle ECUs 111 connected thereto via the Ethernet cables 11, in accordance with an Ethernet communication standard, for example. Hereinafter, a frame conforming to the Ethernet communication standard is referred to as "Ethernet frame". An IP packet is stored in the Ethernet frame.

The in-vehicle communication system 300 may not necessarily be configured to perform relay of an Ethernet frame in accordance with the Ethernet communication standard, and may be configured to perform relay of data in accordance with another communication standard such as CAN (Controller Area Network), FlexRay (registered trademark), MOST (Media Oriented Systems Transport) (registered trademark), or LIN (Local Interconnect Network), for example.

Examples of the in-vehicle ECUs 111 include an automated driving ECU, an engine ECU, a sensor, a navigation device, a human-machine interface, and a camera.

In this example, the in-vehicle ECUs 111A, 111B, and 111C are a vehicle speed sensor, an engine ECU, and an automated driving ECU, respectively.

Hereinafter, the in-vehicle ECUs 111A, 111B, and 111C are also referred to as a vehicle speed sensor 111A, an engine ECU 111B, and an automated driving ECU 111C, respectively.

Each application 112 performs, for example, a process for an application layer, thereby performing a predetermined process in the in-vehicle ECU 111 in which the application 112 is installed. For example, the application 112A in the vehicle speed sensor 111A generates, in a predetermined cycle, speed information indicating a traveling speed of the vehicle 1.

For example, the vehicle speed sensor 111A periodically or non-periodically adds the speed information indicating the speed of the vehicle 1, to a frame, and transmits the frame to another in-vehicle ECU 111.

The engine ECU 111B receives the speed information from the in-vehicle ECU 111A via the relay device 100, and controls the engine on the basis of the received speed information, and the like.

The automated driving ECU 111C receives the speed information from the in-vehicle ECU 111A via the relay device 100, and performs automated driving control of the vehicle 1 on the basis of the received speed information, and the like.

That is, the vehicle speed sensor 111A is a server ECU that provides a service of notifying the speed information. Meanwhile, the engine ECU 111B and the automated driving ECU 111C are client ECUs that receive the service provided from the vehicle speed sensor 111A.

Each function unit transmits and receives a frame conforming to a predetermined protocol. For example, each in-vehicle ECU 111 transmits and receives a frame conforming to SOME/IP (Scalable Service-Oriented Middleware on Ethernet/Internet Protocol).

Figure 2:
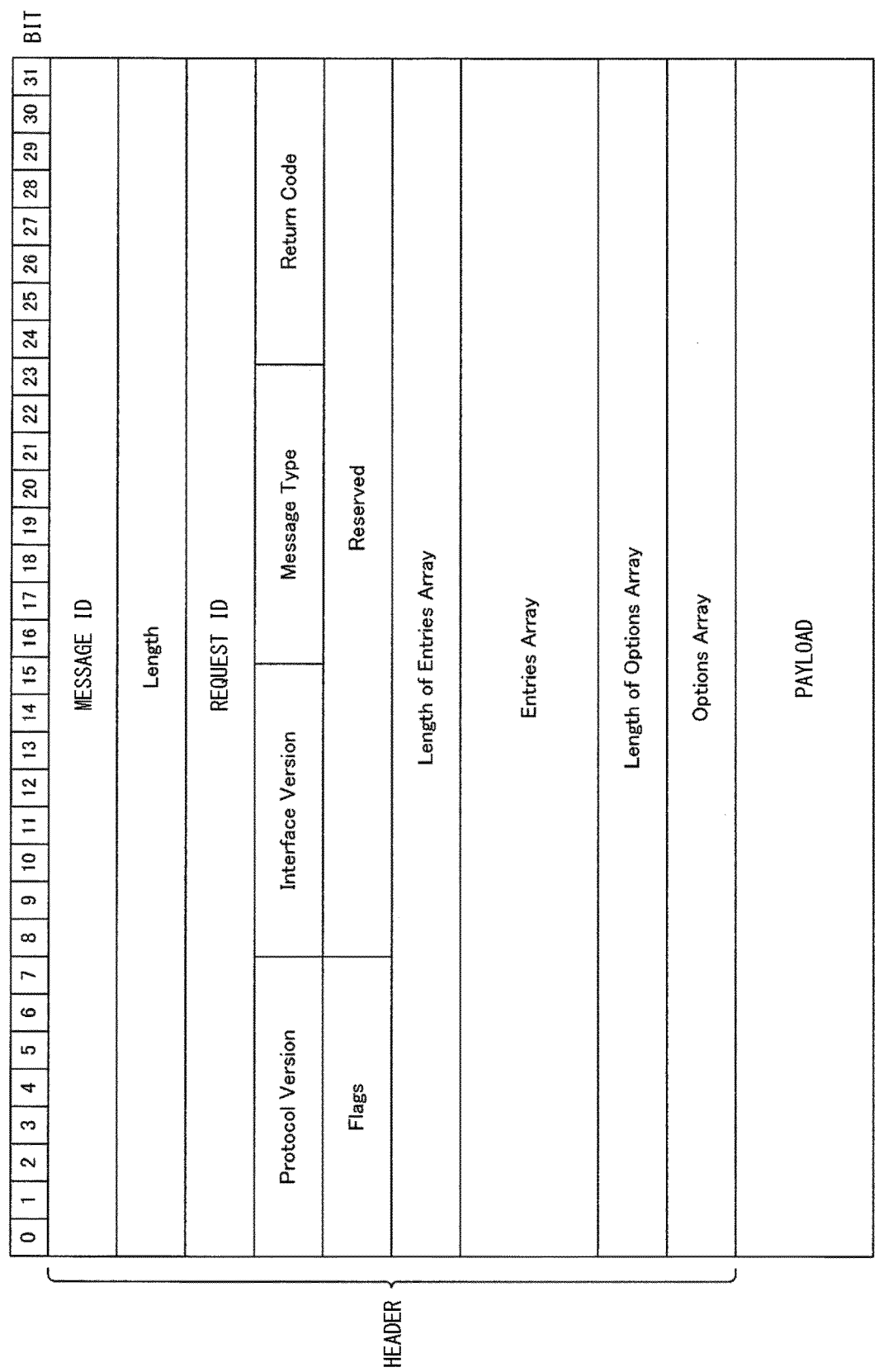
FIG. 2 shows an example of a frame transmitted and received by in-vehicle ECUs according to the embodiment of the present disclosure.

FIG. 2 shows an example of a frame transmitted and received by the in-vehicle ECUs according to the embodiment of the present disclosure. FIG. 2 shows an example of a frame that conforms to SOME/IP and is transmitted and received between the in-vehicle ECUs 111.

With reference to FIG. 2, a header of the frame conforming to SOME/IP includes fields of Message ID, Length, Request ID, Protocol Version, Interface Version, Message Type, Return Code, Flags, Reserve, Length of Entries Array, Entries Array, Length of Options Array, and Options Array.

FIG. 3 shows an example of a frame transmitted and received by the in-vehicle ECUs according to the embodiment of the present disclosure. FIG. 3 shows in more detail the field of Entries Array in the frame shown in FIG. 2.

With reference to FIG. 3, the field of Entries Array in the frame conforming to SOME/IP includes fields of Type, Index 1st options, Index 2nd options, # of opt 1, # of opt 2, Service ID, Instance ID, Major Version, TTL (Time To Live), Reserve, Initial Data Requested Flag, Reserve2, Counter, and Eventgroup ID.

The in-vehicle ECU 111 transmits and receives, via the relay device 100, a communication setting frame which is a frame conforming to SOME/IP and used for establishing communication connection with another in-vehicle ECU 111.

The in-vehicle ECU 111 establishes communication connection with another in-vehicle ECU 111 by transmitting and receiving the communication setting frame via the relay device 100, and communicates with the other in-vehicle ECU 111 by using the frame conforming to SOME/P.

For example, a server ECU and a client ECU establish communication connection by transmitting and receiving a communication setting frame via the relay device 100. Then, the server ECU starts to provide a service to the client ECU, with which communication connection has been established, by using a frame conforming to SOME/IP.

Specifically, the server ECU and the client ECU transmit and receive the communication setting frame, thereby determining to establish communication connection and start provision and reception of the service. Then, the server ECU periodically or non-periodically transmits, to the client ECU via the relay device 100, a service provision frame that conforms to SOME/IP and is used for providing the service.

In the communication setting frame transmitted and received between the server ECU and the client ECU, information, with which the client ECU as a request source of the service is identifiable, is stored in the field of Request ID. More specifically, a MAC address of the client ECU is stored in the field of Request ID.

In the communication setting frame transmitted and received between the server ECU and the client ECU, information, with which the content of the service of the server ECU is identifiable, is stored in the field of Message ID. More specifically, information indicating the content of the service provided by the server ECU is stored in the field of the Message ID.

[Relay Device]

Figure 4:
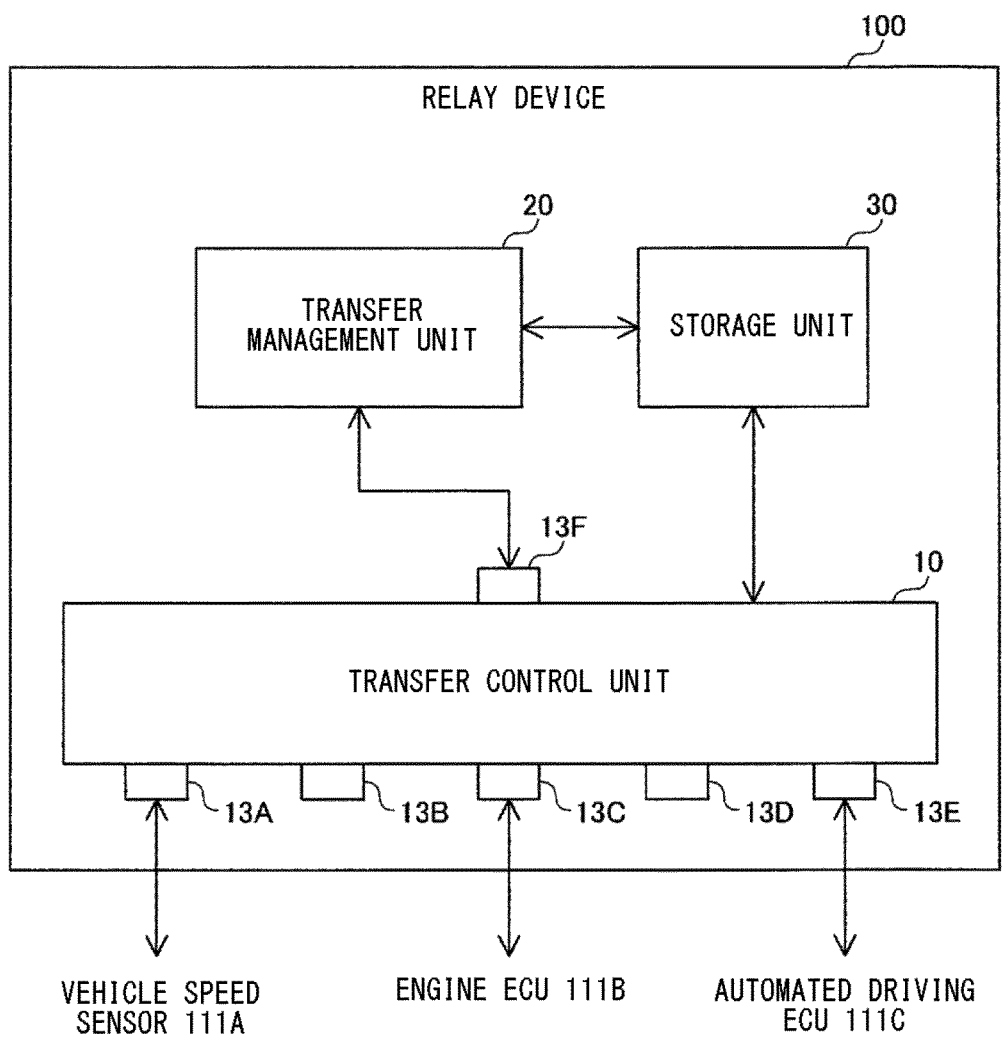
FIG. 4 shows an example of a configuration of a relay device according to the embodiment of the present disclosure.

FIG. 4 shows an example of the configuration of the relay device according to the embodiment of the present disclosure.

With reference to FIG. 4, the relay device 100 includes a transfer control unit 10, a transfer management unit 20, and a storage unit 30. The transfer control unit 10 includes communication ports 13A, 13B, 13C, 13D, 13E, and 13F. The transfer control unit 10 is an example of a relay unit. The transfer management unit 20 is an example of a relay management unit.

The transfer control unit 10 is implemented by a semiconductor integrated circuit, for example. The transfer management unit 20 is implemented by a processor such as a CPU (Central Processing Unit) or a DSP (Digital Signal Processor), for example. The storage unit 30 is a flash memory, for example.

The communication ports 13A, 13B, 13C, 13D, 13E, and 13F are input/output ports, for example. Hereinafter, each of the communication ports 13A, 13B, 13C, 13D, 13E, and 13F is also referred to as a communication port 13.

In the example shown in FIG. 1 and FIG. 4, the vehicle speed sensor 111A is connected to the communication port 13A via a wiring pattern and the Ethernet cable 11, the engine ECU 111B is connected to the communication port 13C via a wiring pattern and the Ethernet cable 11, the automated driving ECU 111C is connected to the communication port 13E via a wiring pattern and the Ethernet cable 11, and the transfer management unit 20 is connected to the communication port 13F via a wiring pattern. The communication ports 13A, 13B, 13C, 13D, and 13E may be external connectors or the like of the relay device 100.

[Transfer Control Unit]

The transfer control unit 10 performs a relay process for frames transmitted and received between the function units. More specifically, the transfer control unit 10 receives, from an in-vehicle ECU 111, a frame addressed to another in-vehicle ECU 111 via a corresponding communication port 13, and transmits the frame to the other in-vehicle ECU 111 via the corresponding communication port.

For example, the storage unit 30 has, stored therein, an address table in which each communication port 13 is associated with a MAC address of a device connected via the communication port 13.

FIG. 5 shows an example of the address table stored in the storage unit of the relay device according to the embodiment of the present disclosure.

With reference to FIG. 5, in the address table, for example, the vehicle speed sensor 111A has a MAC address of "MAC-A", the engine ECU 111B has a MAC address of "MAC-B", the automated driving ECU 111C has a MAC address of "MAC-C", and the transfer management unit 20 as a MAC address of "MAC-D".

When the destination MAC address of a frame received from the vehicle speed sensor 111A via the communication port 13A is "MAC-B", the transfer control unit 10 transmits the frame to the engine ECU 111B via the communication port 13C corresponding to "MAC-B", according to the address table in the storage unit 30.

The transfer control unit 10 receives a target frame from a function unit, and selectively outputs the received target frame to the transfer management unit 20. The target frame is a frame that is transmitted and received according to a predetermined communication protocol and includes information with which a request source of a service is identifiable, and information with which the content of the requested service is identifiable.

For example, the transfer control unit 10 outputs a target frame received from a function unit to the transfer management unit 20 without relaying the target frame to another function unit.

More specifically, the transfer control unit 10 receives, from the automated driving ECU 111C, a frame addressed to the vehicle speed sensor 111A via the communication port 13E, and confirms, for example, a port number in an UDP header of the received frame. If the port number of the frame matches a port number assigned in advance to a frame conforming to SOME/IP, the transfer control unit 10 determines that the received frame is a target frame. The transfer control unit 10 may be configured to determine whether or not a received frame is a target frame on the basis of the MAC address or IP address of the received frame.

Upon determining that the received frame is a target frame, the transfer control unit 10 rewrites a destination MAC address of the target frame to "MAC-D" which is the MAC address of the transfer management unit 20. Then, the transfer control unit 10 outputs the target frame to the transfer management unit 20 via the communication port 13F, according to the address table in the storage unit 30.

Meanwhile, upon determining that the received frame is not a target frame, the transfer control unit 10 transmits the frame to the vehicle speed sensor 111A via the communication port 13A, according to the address table in the storage unit 30.

For example, the transfer control unit 10 outputs, to the transfer management unit 20, place information indicating a reception location of the target frame in the relay device 100.

More specifically, for example, the transfer control unit 10 outputs, to the transfer management unit 20, port information as the place information indicating a communication port 13 through which the received target frame has been transmitted, among the plurality of communication ports 13 in the relay device 100.

Specifically, if the transfer control unit 10 determines that a frame, which has been received from the automated driving ECU 111C via the communication port 13E and is addressed to the vehicle speed sensor 111A, is a target frame, the transfer control unit 10 generates port information indicating that the target frame has been received via the communication port 13E, and outputs the generated port information to the transfer management unit 20 together with the target frame.

[Transfer Management Unit]

The transfer management unit 20 determines whether or not the content of the target frame received from the transfer control unit 10 satisfies a predetermined condition. More specifically, the transfer management unit 20 determines, as the predetermined condition, whether or not the target frame is a communication setting frame.

For example, the transfer management unit 20 determines whether or not the target frame is a communication setting frame, on the basis of a message ID in the header of the target frame that has been received from the transfer control unit 10 and conforms to SOME/IP as a communication protocol.

When the content of the target frame received from the transfer control unit 10 satisfies the predetermined condition, that is, when the target frame is a communication setting frame, the transfer management unit 20 stores, in the target frame, position information regarding the position, in the in-vehicle network 12, of a function unit as a request source of a service related to the target frame or a function unit as a request destination of the service related to the target frame.

For example, the transfer management unit 20 stores, in the target frame, the place information received from the transfer control unit 10 as the position information. More specifically, the transfer management unit 20 stores, in the target frame, the port information received from the transfer control unit 10 as the position information.

Moreover, for example, the transfer management unit 20 stores, in the target frame, identification information of the relay device 100 as the position information. More specifically, upon receiving the target frame from the transfer control unit 10, the transfer management unit 20 acquires the ID of the relay device 100 stored in the storage unit 30, and stores the acquired ID in the target frame.

Referring back to FIG. 2, the transfer management unit 20 stores the position information such as the port information, the ID, or the like, in the field of Options Array in the target frame.

Then, the transfer management unit 20 outputs the target frame having the position information stored therein, to the transfer control unit 10.

Upon receiving the target frame having the position information stored therein from the transfer management unit 20, the transfer control unit 10 transmits the received target frame to a function unit, e.g., an in-vehicle ECU 111, which is a destination of the target frame.

[Communication Connection Between Function Units]

On the basis of position information stored in a target frame received from the relay device 100, a function unit determines whether or not to perform a process for a service related to the target frame.

More specifically, the function unit, e.g., an in-vehicle ECU 111, receives a communication setting frame from another in-vehicle ECU 111 via the relay device 100, and confirms whether or not the received communication setting frame has position information stored therein.

When the communication setting frame received from the other in-vehicle ECU 111 has position information stored therein, the in-vehicle ECU 111 acquires the position information, and determines, on the basis of the acquired position information, whether or not to perform a process for a service related to the communication setting frame, e.g., a process for establishing communication connection with the other in-vehicle ECU 111.

Specifically, on the basis of position information acquired from a communication setting frame, a server ECU determines whether or not to perform a process for starting provision of a service to a client ECU which is a transmission source of the communication setting frame. Meanwhile, on the basis of position information acquired from a communication setting frame, the client ECU determines whether or not to perform a process for starting subscription of the service from the server ECU which is a transmission source of the communication setting frame.

Example 1 of Communication Connection Between Server ECU and Client ECU

For example, when a client ECU has been added as a new in-vehicle ECU 111 to the in-vehicle network 12, the client ECU generates a service search frame which is an example of the communication setting frame and includes information indicating that the client ECU is currently searching for a server ECU capable of providing a service that the client ECU requires. Then, the client ECU multicasts the generated service search frame to other in-vehicle ECUs 111 via the relay device 100.

Figure 6:
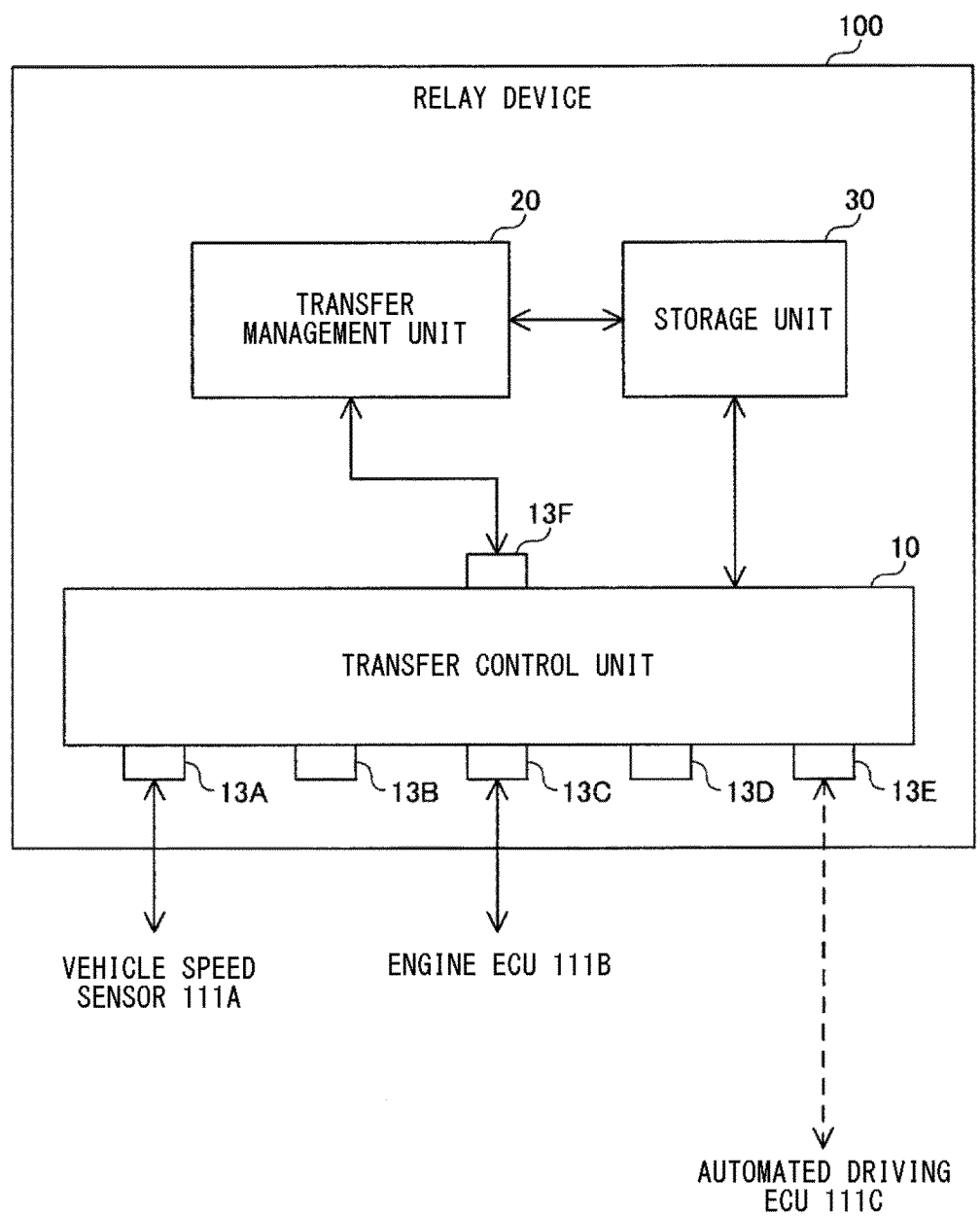
FIG. 6 shows an example of a situation where a new in-vehicle ECU is connected to the relay device according to the embodiment of the present disclosure.

FIG. 6 shows an example of a situation where a new in-vehicle ECU is connected to the relay device according to the embodiment of the present disclosure.

With reference to FIG. 6, for example, the automated driving ECU 111C as a client ECU is connected to the communication port 13E of the transfer control unit 10 and thereby added to the in-vehicle network 12. Then, the automated driving ECU 111C generates a service search frame including information indicating that the automated driving ECU 111C is currently searching for a server ECU capable of transmitting speed information, and multicasts the generated service search frame to other in-vehicle ECUs 111 via the relay device 100.

The transfer management unit 20 in the relay device 100 stores position information in the service search frame received from the automated driving ECU 111C via the transfer control unit 10, and transmits the service search frame having the position information stored therein, to other in-vehicle ECUs 111 via the transfer control unit 10.

The vehicle speed sensor 111A as a server ECU receives the service search frame from the automated driving ECU 111C via the relay device 100, and acquires the position information stored in the received service search frame. Then, on the basis of the acquired position information, the vehicle speed sensor 111A recognizes that the automated driving ECU 111C as a transmission source of the service search frame is connected to the communication port 13E in the relay device 100.

Referring back to FIG. 1, for example, the storage unit 113 in each in-vehicle ECU 111 has, stored therein, an addition permission table providing information with which a permitted communication port and a non-permitted communication port can be recognized. The former port is a communication port 13 to which addition of a function unit is permitted, and the latter port is a communication port 13 to which addition of a function unit is not permitted.

FIG. 7 shows an example of an addition permission table stored in a storage unit of an in-vehicle ECU according to the embodiment of the present disclosure. With reference to FIG. 7, in the addition permission table, the communication ports 13A, 13C, and 13E are permitted communication ports, and the communication ports 13B and 13D are non-permitted communication ports.

For example, when the vehicle speed sensor 111A has recognized that the communication port 13E is a permitted communication port on the basis of the addition permission table in the storage unit 113A, the vehicle speed sensor 111A generates a service provision notification frame which is an example of the communication setting frame and includes its own MAC address and information indicating that the vehicle speed sensor 111A can transmit speed information. Then, the vehicle speed sensor 111A transmits the generated service provision notification frame to the automated driving ECU 111C via the relay device 100, as a response to the service search frame.

The automated driving ECU 111C receives the service provision notification frame from the vehicle speed sensor 111A via the relay device 100, and generates a service subscription request frame which is an example of the communication setting frame and includes its own ID and information indicating that the automated driving ECU 111C requests transmission of the speed information. Then, the automated driving ECU 111C transmits the generated service subscription request frame to the vehicle speed sensor 111A via the relay device 100.

The vehicle speed sensor 111A receives the service subscription request frame from the automated driving ECU 111C via the relay device 100, and determines, based on the ID of the automated driving ECU 111C, etc., included in the received service subscription request frame, whether or not to permit the automated driving ECU 111C to subscribe to the service, that is, whether or not to start transmission of the speed information to the automated driving ECU 111C.

Then, the vehicle speed sensor 111A generates a service subscription propriety frame which is an example of the communication setting frame and includes information indicating the content of the determination, and transmits the generated service subscription propriety frame to the automated driving ECU 111C via the relay device 100, as a response to the service subscription request frame.

When the vehicle speed sensor 111A has determined to start provision of the service to the automated driving ECU 111C, the vehicle speed sensor 111A periodically or non-periodically transmits a service provision frame conforming to SOME/IP, to the automated driving ECU 111C via the relay device 100. More specifically, the vehicle speed sensor 111A periodically or non-periodically transmits the service provision frame including the speed information to the automated driving ECU 111C via the relay device 100.

Figure 8:
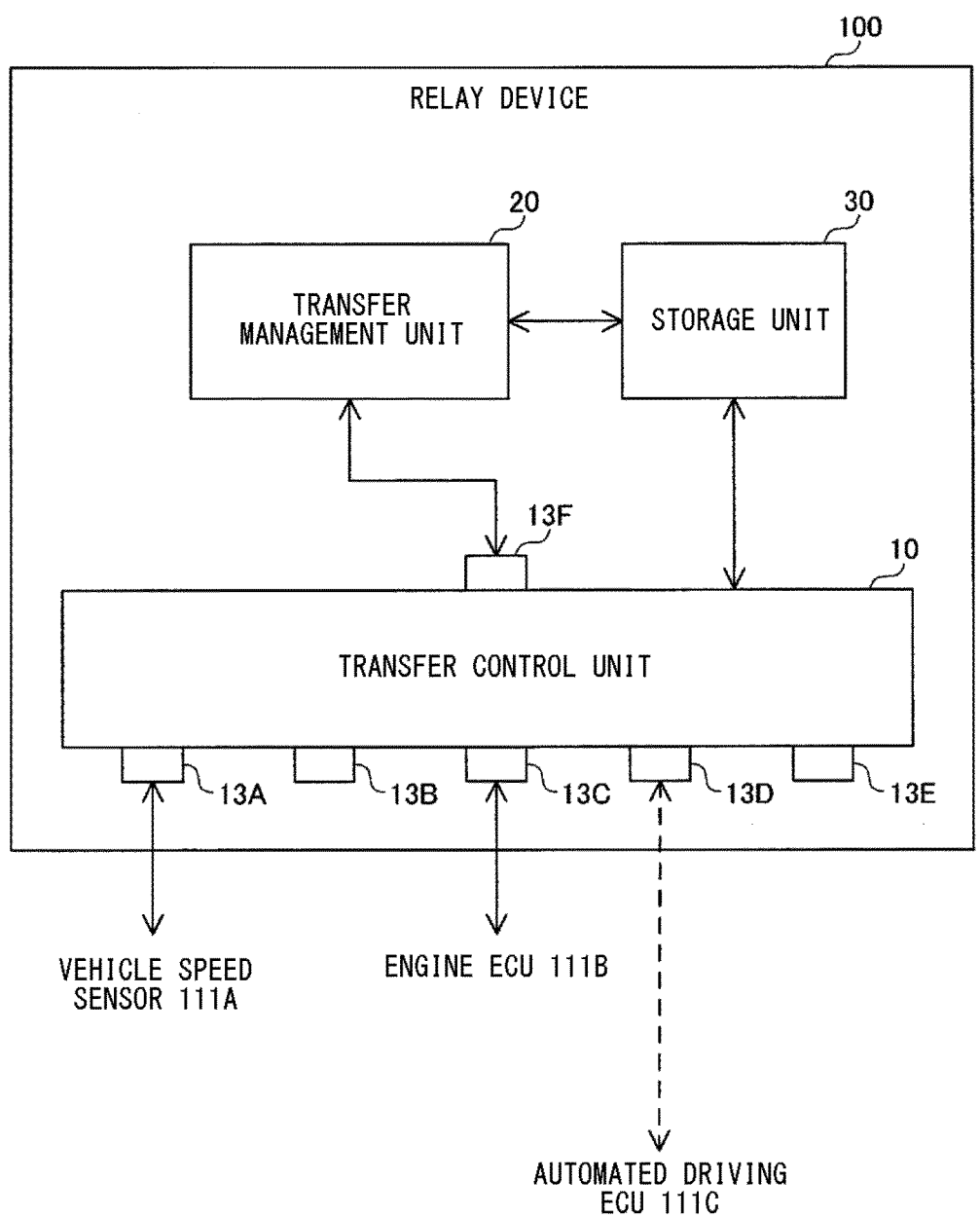
FIG. 8 shows another example of the situation where a new in-vehicle ECU is connected to the relay device according to the embodiment of the present disclosure.

FIG. 8 shows another example of a situation where a new in-vehicle ECU is connected to the relay device according to the embodiment of the present disclosure.

With reference to FIG. 8, for example, the automated driving ECU 111C as a client ECU is connected to the communication port 13D of the transfer control unit 10 and thereby added to the in-vehicle network 12. Then, the automated driving ECU 111C generates a service search frame including information indicating that the automated driving ECU 111C is currently searching for a server ECU capable of transmitting speed information, and multicasts the generated service search frame to other in-vehicle ECUs 111 via the relay device 100.

The transfer management unit 20 in the relay device 100 stores position information in the service search frame received from the automated driving ECU 111C via the transfer control unit 10, and transmits the service search frame having the position information stored therein, to other in-vehicle ECUs 111 via the transfer control unit 10.

The vehicle speed sensor 111A as a server ECU receives the service search frame from the automated driving ECU 111C via the relay device 100, and acquires the position information stored in the received service search frame. Then, on the basis of the acquired position information, the vehicle speed sensor 111A recognizes that the automated driving ECU 111C as a transmission source of the service search frame is connected to the communication port 13D in the relay device 100.

For example, when the vehicle speed sensor 111A has recognized that the communication port 13D is a non-permitted communication port on the basis of addition permission information stored in the storage unit 113A, the vehicle speed sensor 111A discards the received service search frame without transmitting the service provision notification frame to the automated driving ECU 111C via the relay device 100.

An application, which is an example of a function unit, is downloaded to the automated driving ECU 111C connected to the communication port 13E or 13D of the transfer control unit 10, whereby the same operation as that described with reference to FIG. 6 to FIG. 8 is performed even when the application is added to the in-vehicle network 12.

Example 2 of Communication Connection Between Server ECU and Client ECU

For example, the automated driving ECU 111C as a client ECU periodically or non-periodically generates a service search frame, and multicasts the generated service search frame to other in-vehicle ECUs 111 via the relay device 100.

Figure 9:
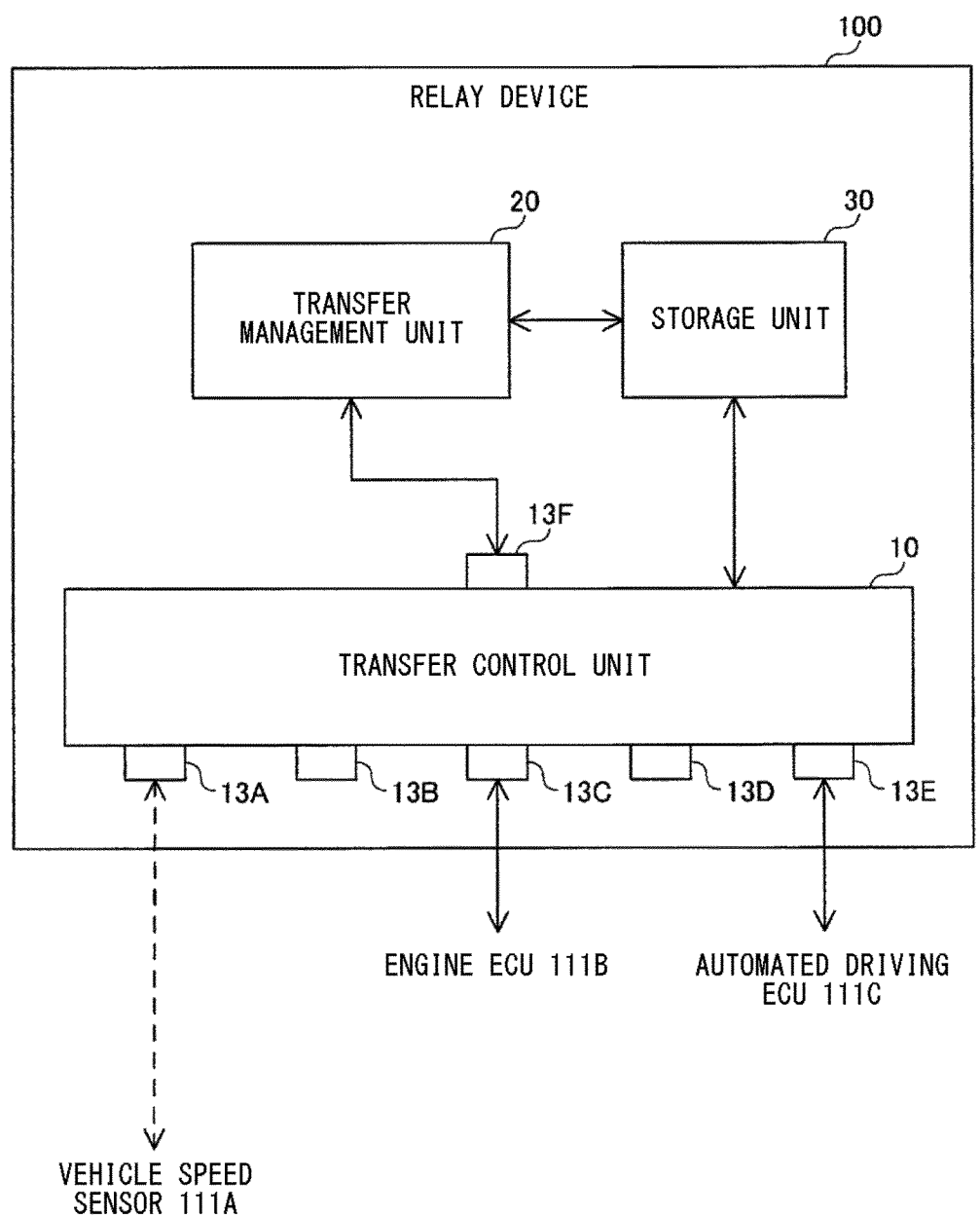
FIG. 9 shows another example of the situation where a new in-vehicle ECU is connected to the relay device according to the embodiment of the present disclosure.

FIG. 9 shows another example of a situation where a new in-vehicle ECU is connected to the relay device according to the embodiment of the present disclosure.

With reference to FIG. 9, for example, the vehicle speed sensor 111A as a server ECU is connected to the communication port 13A of the transfer control unit 10 and thereby added to the in-vehicle network 12. Then, the vehicle speed sensor 111A receives a service search frame from the automated driving ECU 111C, generates a service provision notification frame including its own MAC address and information indicating that the vehicle speed sensor 111A can transmit speed information, and transmits the generated service provision notification frame to the automated driving ECU 111C via the relay device 100, as a response to the service search frame.

The transfer management unit 20 in the relay device 100 stores position information in the service provision notification frame received from the vehicle speed sensor 111A via the transfer control unit 10, and transmits the service provision notification frame having the position information stored therein, to the automated driving ECU 111C via the transfer control unit 10.

The automated driving ECU 111C receives the service provision notification frame from the vehicle speed sensor 111A via the relay device 100, and acquires the position information stored in the received service provision notification frame. Then, on the basis of the acquired position information, the automated driving ECU 111C recognizes that the vehicle speed sensor 111A as a transmission source of the service provision notification frame is connected to the communication port 13A in the relay device 100.

For example, when the automated driving ECU 111C has recognized that the communication port 13A is a permitted communication port on the basis of the addition permission information stored in the storage unit 113C, the automated driving ECU 111C generates a service subscription request frame including its own ID and information indicating that the automated driving ECU 111C requests transmission of the speed information, and transmits the generated service subscription request frame to the vehicle speed sensor 111A via the relay device 100.

The vehicle speed sensor 111A receives the service subscription request frame from the automated driving ECU 111C via the relay device 100, and determines, based on the ID of the automated driving ECU 111C, etc., included in the received service subscription request frame, whether or not to permit the automated driving ECU 111C to subscribe to the service, that is, whether or not to start transmission of the speed information to the automated driving ECU 111C.

Then, the vehicle speed sensor 111A generates a service subscription propriety frame including information indicating the content of the determination, and transmits the generated service subscription propriety frame to the automated driving ECU 111C via the relay device 100, as a response to the service subscription request frame.

When the vehicle speed sensor 111A has determined to start provision of the service to the automated driving ECU 111C, the vehicle speed sensor 111A periodically or non-periodically transmits a service provision frame conforming to SOME/IP, to the automated driving ECU 111C via the relay device 100. More specifically, the vehicle speed sensor 111A periodically or non-periodically transmits the service provision frame including the speed information to the automated driving ECU 111C via the relay device 100.

Figure 10:
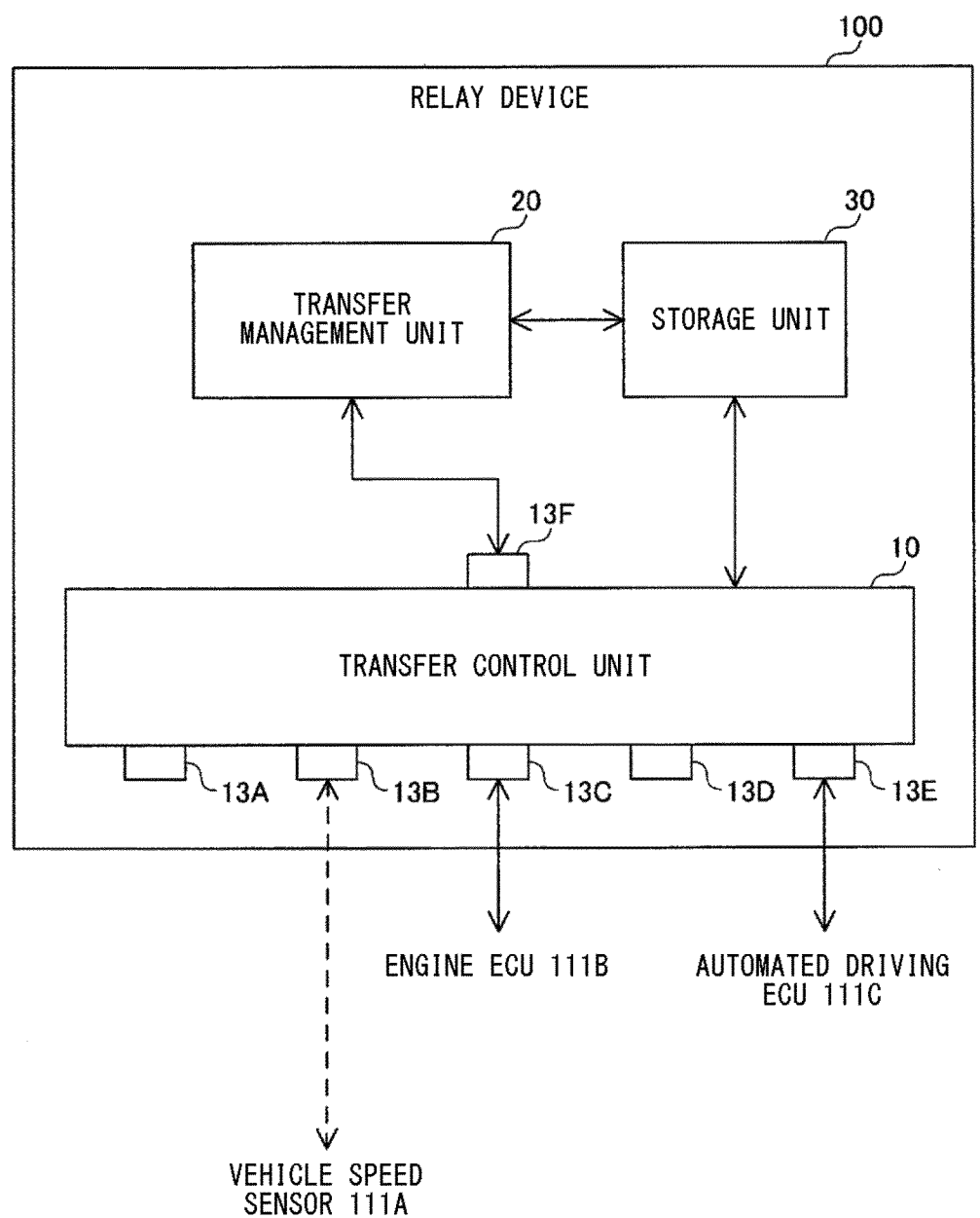
FIG. 10 shows another example of the situation where a new in-vehicle ECU is connected to the relay device according to the embodiment of the present disclosure.

FIG. 10 shows another example of a situation where a new in-vehicle ECU is connected to the relay device according to the embodiment of the present disclosure.

With reference to FIG. 10, for example, the vehicle speed sensor 111A as a server ECU is connected to the communication port 13B of the transfer control unit 10 and thereby added to the in-vehicle network 12. Then, the vehicle speed sensor 111A receives a service search frame from the automated driving ECU 111C, generates a service provision notification frame including its own MAC address and information indicating that the vehicle speed sensor 111A can transmit speed information, and transmits the generated service provision notification frame to the automated driving ECU 111C via the relay device 100, as a response to the service search frame.

The transfer management unit 20 in the relay device 100 stores position information in the service provision notification frame received from the vehicle speed sensor 111A via the transfer control unit 10, and transmits the service provision notification frame having the position information stored therein, to the automated driving ECU 111C via the transfer control unit 10.

The automated driving ECU 111C receives the service provision notification frame from the vehicle speed sensor 111A via the relay device 100, and acquires the position information stored in the received service provision notification frame. Then, on the basis of the acquired position information, the automated driving ECU 111C recognizes that the vehicle speed sensor 111A as a transmission source of the service provision notification frame is connected to the communication port 13B in the relay device 100.

For example, when the automated driving ECU 111C has recognized that the communication port 13B is a non-permitted communication port on the basis of the addition permission information stored in the storage unit 113A, the automated driving ECU 111C discards the received service provision notification frame without transmitting the service subscription request frame to the vehicle speed sensor 111A via the relay device 100.

An application, which is an example of a function unit, is downloaded to the vehicle speed sensor 111A connected to the communication port 13A or 13B of the transfer control unit 10, whereby the same operation as that described with reference to FIG. 9 and FIG. 10 is performed even when the application is added to the in-vehicle network 12.

[Operation Flow]

Each of the devices in the in-vehicle communication system is provided with a computer including a memory. An arithmetic processing unit such as a CPU in the computer reads out, from the memory, a program including a part or all of steps in the flowchart and the sequence diagram described below, and executes the program. Programs of the plurality of devices can each be installed from outside. The programs of the plurality of devices are each distributed in a state of being stored in a storage medium.

Figure 11:
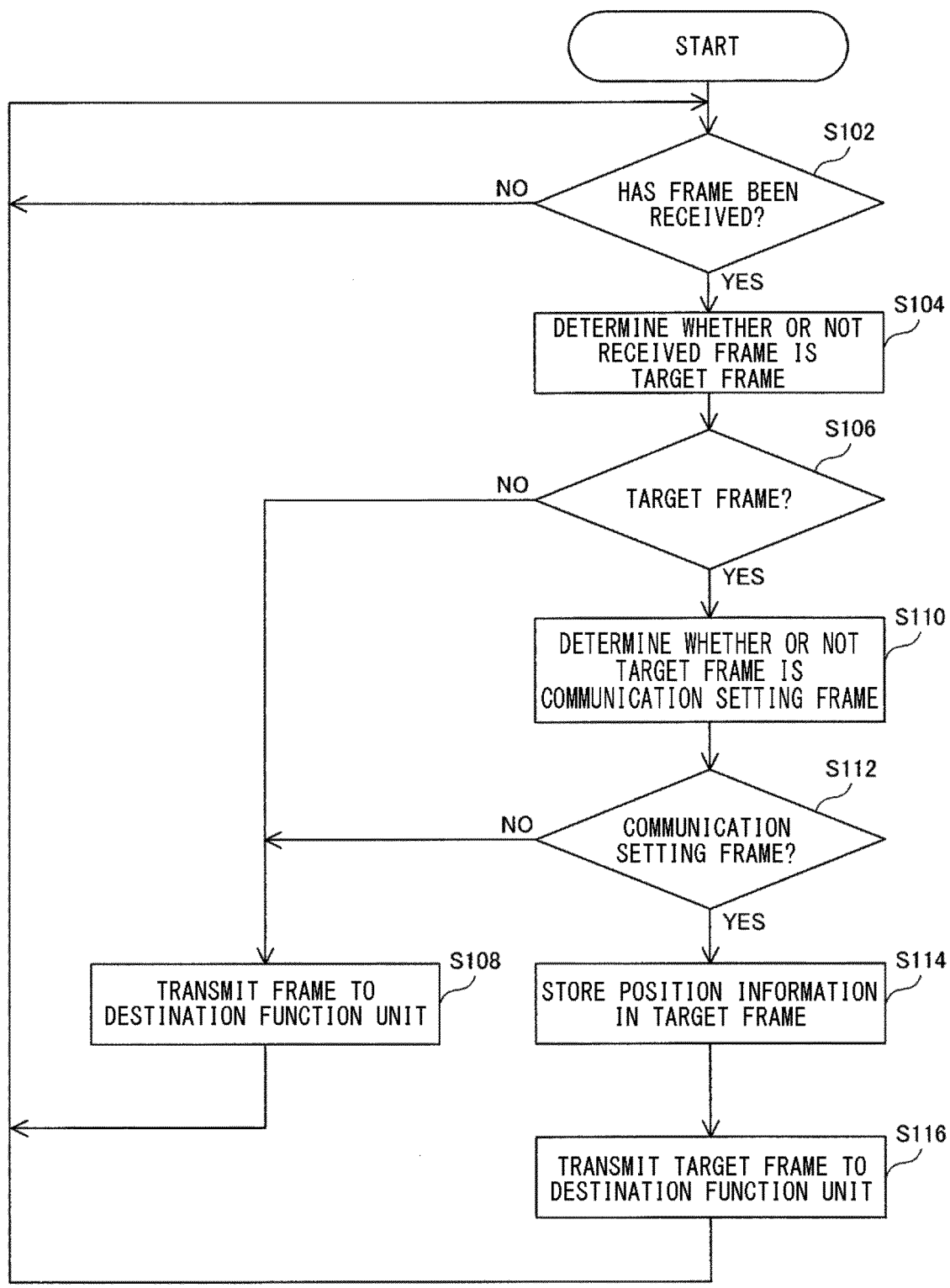
FIG. 11 is a flowchart of an example of an operation procedure when the relay device changes settings of a relay process in the in-vehicle communication system according to the embodiment of the present disclosure.

FIG. 11 is a flowchart showing an example of an operation procedure for changing setting of a relay process by the relay device in the in-vehicle communication system according to the embodiment of the present disclosure.

With reference to FIG. 11, firstly, the relay device 100 waits for a frame from a function unit, e.g., an in-vehicle ECU 111, in the in-vehicle network 12 (NO in step S102), receives a frame from an in-vehicle ECU 111 (YES in step S102), and determines whether or not the received frame is a target frame. More specifically, the relay device 100 confirms a port number in an UDP header of the received frame. If the port number of the frame matches a port number that is assigned in advance to a frame conforming to a predetermined communication protocol such as SOME/IP, the relay device 100 determines that the received frame is a target frame (step S104).

Upon determining that the received frame is not a target frame (NO in step S106), the relay device 100 transmits the frame to a destination function unit, e.g., in-vehicle ECU 111. That is, the relay device 100 relays the frame (step S108).

Next, the relay device 100 waits for a new frame from a function unit (NO in step S102).

Meanwhile, upon determining that the received frame is a target frame (YES in step S106), the relay device 100 determines whether or not the target frame is a communication setting frame. More specifically, the transfer control unit 10 in the relay device 100 outputs the target frame to the transfer management unit 20. For example, the transfer control unit 10 outputs, to the transfer management unit 20, port information indicating a communication port 13 through which the received target frame has been transmitted, together with the target frame. Then, the transfer management unit 20 determines whether or not the target frame is a communication setting frame on the basis of the information stored in the header of the target frame received from the transfer control unit 10 (step S110).

Upon determining that the target frame is not a communication setting frame (NO in step S112), the relay device 100 transmits the target frame to a destination function unit, e.g., in-vehicle ECU 111. More specifically, the transfer management unit 20 in the relay device 100 transmits the target frame to the destination function unit, e.g., in-vehicle ECU 111, via the transfer control unit 10. That is, the relay device 100 relays the frame (step S108).

Meanwhile, upon determining that the target frame is a communication setting frame (YES in step S112), the relay device 100 stores, in the target frame, position information of a function unit as a request source of a service related to the target frame or position information of a function unit as a request destination of the service related to the target frame (step S114).

Next, the relay device 100 transmits the target frame having the position information stored therein, to the destination function unit, e.g., in-vehicle ECU 111 (step S116).

Next, the relay device 100 waits for a new frame from a function unit (NO in step S102).

Figure 12:
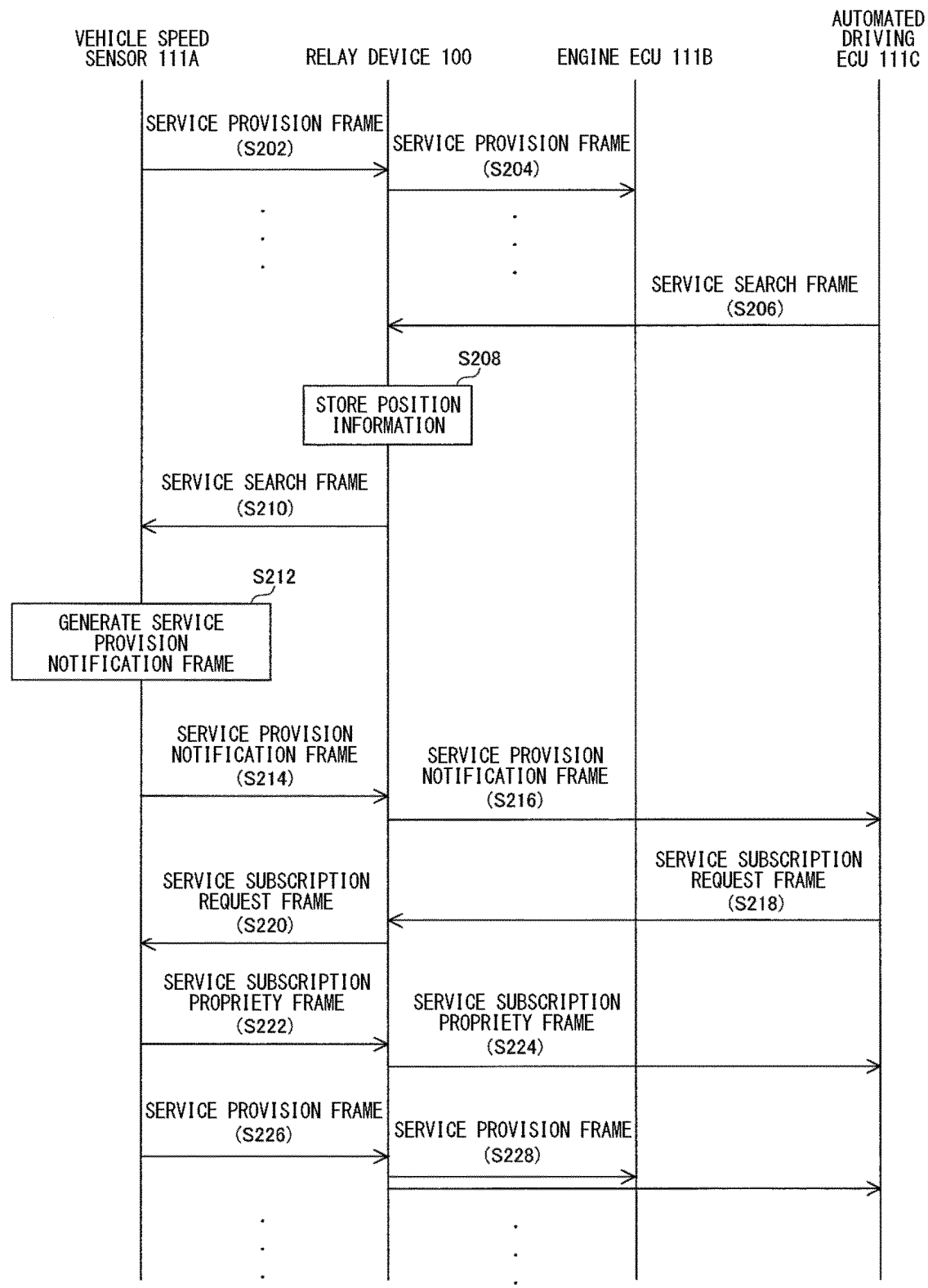
FIG. 12 shows an example of a sequence of a process for relaying frames between function units in the in-vehicle communication system according to the embodiment of the present disclosure.

FIG. 12 shows an example of a sequence of a process for relaying frames between function units in the in-vehicle communication system according to the embodiment of the present disclosure.

With reference to FIG. 12, the vehicle speed sensor 111A which is an example of a function unit transmits, to the relay device 100, a service provision frame that includes speed information and is addressed to the engine ECU 111B, at a timing to transmit the speed information (step S202).

Next, the relay device 100 receives the service provision frame from the vehicle speed sensor 111A, and transmits the received service provision frame to the engine ECU 111B which is an example of a function unit. That is, the relay device 100 relays the service provision frame from the vehicle speed sensor 111A to the engine ECU 111B (step S204).

Next, when the automated driving ECU 111C which is an example of a function unit is connected to the communication port 13E of the transfer control unit 10 and thereby added to the in-vehicle network 12, the automated driving ECU 111C transmits a service search frame which is an example of the communication setting frame, to the relay device 100 (step S206).

Next, the relay device 100 stores position information in the service search frame received from the automated driving ECU 111C (step S208).

Next, the relay device 100 relays the service search frame having the position information stored therein, to another in-vehicle ECU 111, e.g., the vehicle speed sensor 111A (step S210).

Next, the vehicle speed sensor 111A receives the service search frame, acquires the position information stored in the received service search frame, and determines whether or not to perform a process for establishing communication connection with the automated driving ECU 111C, on the basis of the acquired position information. Then, the vehicle speed sensor 111A determines to perform the process for establishing communication connection with the automated driving ECU 111C because the communication port 13E is a permitted communication port, and generates a service provision notification frame which is an example of the communication setting frame (step S212).

Next, the vehicle speed sensor 111A transmits the generated service provision notification frame to the relay device 100, as a response to the service search frame (step S214).

Next, the relay device 100 relays the service provision notification frame received from the vehicle speed sensor 111A, to the automated driving ECU 111C (step S216).

Next, the automated driving ECU 111C transmits a service subscription request frame which is an example of the communication setting frame to the relay device 100 (step S218).

Next, the relay device 100 relays the service subscription request frame received from the automated driving ECU 111C, to the vehicle speed sensor 111A (step S220).

Next, the vehicle speed sensor 111A transmits, as a response to the service subscription request, a service subscription propriety frame which is an example of a communication setting frame and in which information indicating that service subscription is permitted is stored, to the relay device 100 (step S222).

Next, the relay device 100 relays the service subscription propriety frame to the automated driving ECU 111C (step S224).

Next, the vehicle speed sensor 111A transmits a service provision frame addressed to the engine ECU 111B and the automated driving ECU 111C, to the relay device 100, at a next transmission timing for transmitting the speed information (step S226).

Next, the relay device 100 receives the service provision frame from the vehicle speed sensor 111A, and transmits the received service provision frame to the engine ECU 111B and the automated driving ECU 111C (step S228).

Figure 13:
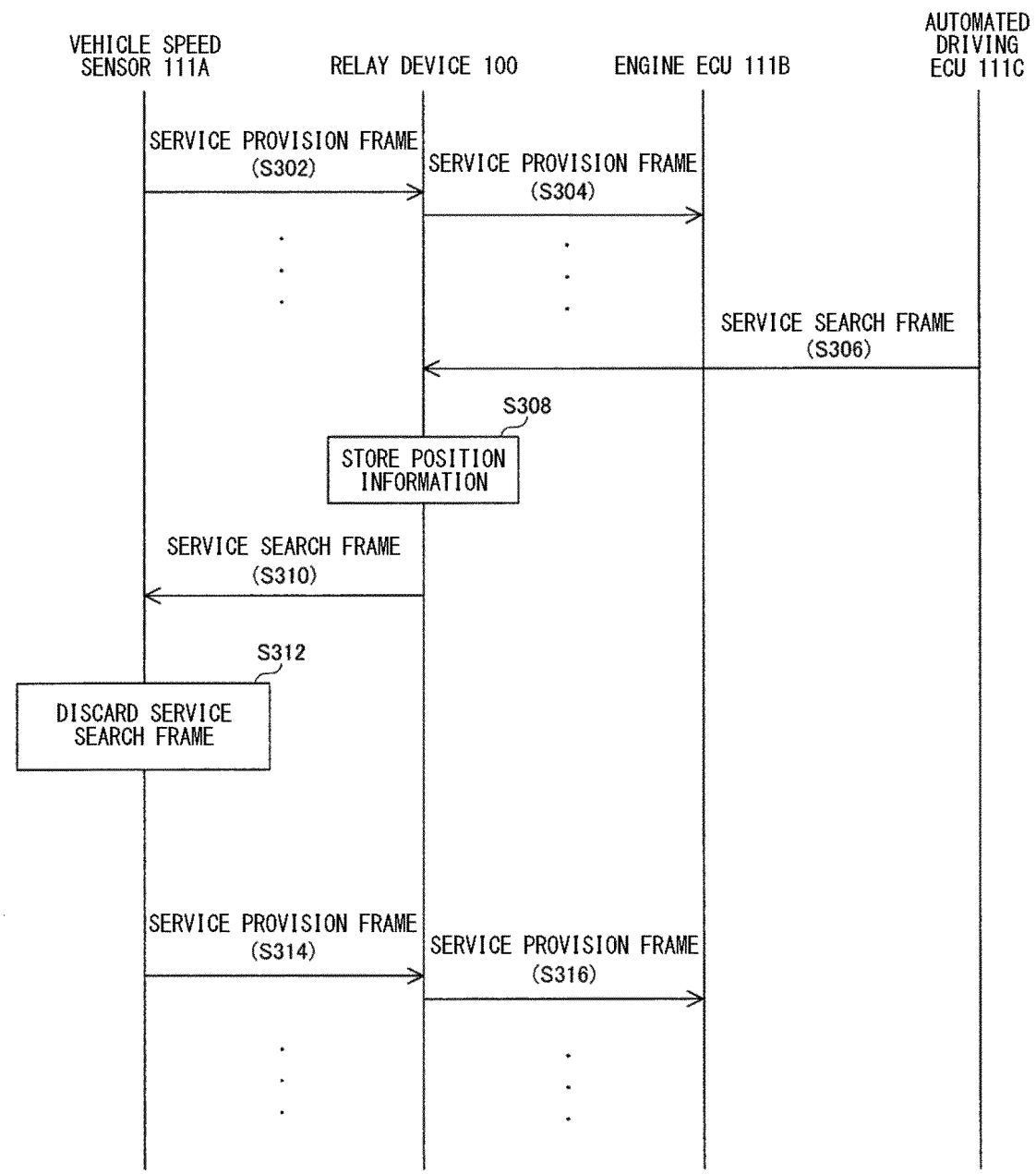
FIG. 13 shows another example of a sequence of a process for relaying frames between function units in the in-vehicle communication system according to the embodiment of the present disclosure.

FIG. 13 shows another example of a sequence of a process for relaying frames between function units in the in-vehicle communication system according to the embodiment of the present disclosure.

With reference to FIG. 13, the vehicle speed sensor 111A which is an example of a function unit transmits, to the relay device 100, a service provision frame that includes speed information and is addressed to the engine ECU 111B, at a timing to transmit the speed information (step S302).

Next, the relay device 100 receives the service provision frame from the vehicle speed sensor 111A, and transmits the received service provision frame to the engine ECU 111B which is an example of a function unit. That is, the relay device 100 relays the service provision frame from the vehicle speed sensor 111A to the engine ECU 111B (step S304).

Next, when the automated driving ECU 111C which is an example of a function unit is connected to the communication port 13D of the transfer control unit 10 and thereby added to the in-vehicle network 12, the automated driving ECU 111C transmits the service search frame to the relay device 100 (step S306).

Next, the relay device 100 stores position information in the service search frame received from the automated driving ECU 111C (step S308).

Next, the relay device 100 relays the service search frame having the position information stored therein, to another in-vehicle ECU 111, e.g., vehicle speed sensor 111A (step S310).

Next, the vehicle speed sensor 111A receives the service search frame, acquires the position information stored in the received service search frame, and determines whether or not to perform a process for establishing communication connection with the automated driving ECU 111C, on the basis of the acquired position information. Then, the vehicle speed sensor 111A determines not to perform the process for establishing communication connection with the automated driving ECU 111C because the communication port 13D is a non-permitted communication port, and discards the received service search frame (step S312).

Next, the vehicle speed sensor 111A transmits a service provision frame addressed to the engine ECU 111B, to the relay device 100 at a next timing to transmit the speed information (step S314).

Next, the relay device 100 receives the service provision frame from the vehicle speed sensor 111A, and transmits the received service provision frame to the engine ECU 111B (step S316).

[Modification 1]

Figure 14:
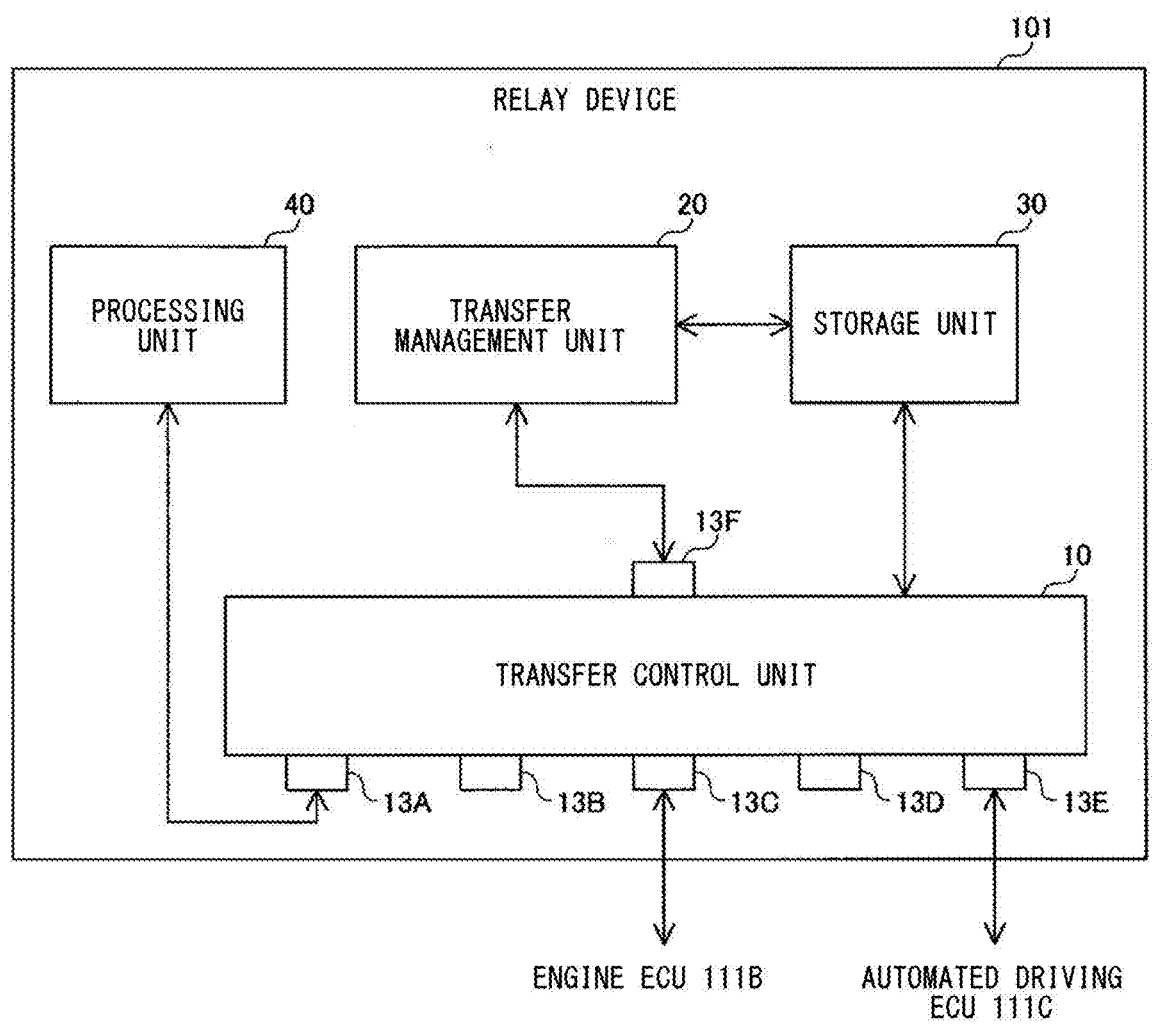
FIG. 14 shows a configuration of a modification of the relay device according to the embodiment of the present disclosure.

FIG. 14 shows a configuration of a modification of the relay device according to the embodiment of the present disclosure.

With reference to FIG. 14, the relay device 101 includes a transfer control unit 10, a transfer management unit 20, a storage unit 30, and a processing unit 40.

The processing unit 40 is an example of a function unit in the in-vehicle network 12. The processing unit 40 is connected to, for example, the communication port 13A of the transfer control unit 10. For example, the processing unit 40 acquires information such as speed information from an in-vehicle ECU 111 in the in-vehicle network 12, and transmits the acquired information to another in-vehicle ECU 111.

The processing unit 40 transmits and receives, via the transfer control unit 10, a communication setting frame, conforming to SOME/IP, for establishing communication connection with an in-vehicle ECU 111.

For example, the processing unit 40 functions as a server, establishes communication connection with a client ECU, and starts provision of a service to the client ECU by using the frame conforming to SOME/IP. Specifically, the processing unit 40 periodically or non-periodically transmits a service provision frame including information such as speed information, to the in-vehicle ECU 111 via the transfer control unit 10.

Meanwhile, the processing unit 40 functions as a client, establishes communication connection with a server ECU, and receives provision of a service from the server ECU by using the frame conforming to SOME/IP. Specifically, the processing unit 40 periodically or non-periodically receives a service provision frame including information such as speed information, from the in-vehicle ECU 111 via the transfer control unit 10.

The transfer control unit 10 performs a relay process for frames transmitted and received between the processing unit 40 and the in-vehicle ECUs 111.

For example, the transfer control unit 10 receives a communication setting frame from the processing unit 40, and selectively outputs the received target frame to the transfer management unit 20. Meanwhile, the transfer control unit 10 receives a communication setting frame from an in-vehicle ECU 111, and selectively outputs the received target frame to the transfer management unit 20.

When the content of the target frame received from the transfer control unit 10 satisfies a predetermined condition, that is, when the target frame is a communication setting frame, the transfer management unit 20 stores position information in the target frame. Then, the transfer management unit 20 outputs the target frame having the position information stored therein, to the transfer control unit 10.

Upon receiving the target frame having the position information stored therein from the transfer management unit 20, the transfer control unit 10 transmits the received target frame to a destination function unit, e.g., the processing unit 40.

On the basis of the position information stored in the target frame received from the transfer control unit 10, the processing unit 40 determines whether or not to perform a process for a service related to the target frame.

[Modification 2]

Figure 15:
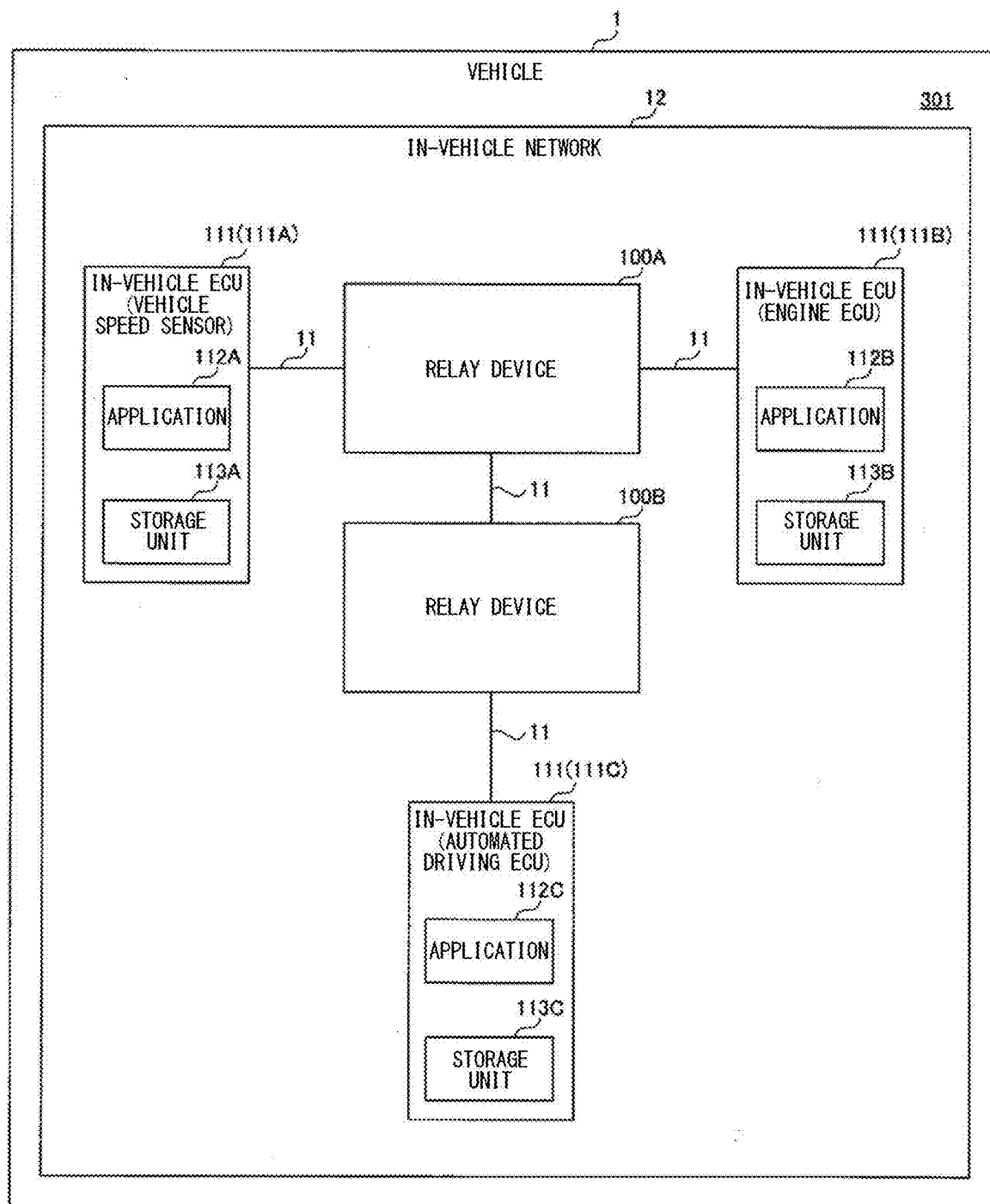
FIG. 15 shows a configuration of a modification of the in-vehicle communication system according to the embodiment of the present disclosure.

FIG. 15 shows a configuration of a modification of the in-vehicle communication system according to the embodiment of the present disclosure.

With reference to FIG. 15, an in-vehicle communication system 301 includes in-vehicle ECUs 111A to 111C, and relay devices 100. The in-vehicle communication system 301 includes relay devices 100A and 100B as the relay devices 100.

The relay device 100A and the relay device 100B are connected to each other via an Ethernet cable 11.

The automated driving ECU 111C is connected to a communication port in the relay device 100B via an Ethernet cable 11 and a wiring pattern. A connection relationship between the vehicle speed sensor 111A, the engine ECU 111B, and the relay device 100A is the same as that shown in FIG. 4.

The transfer control unit 10 in the relay device 100B receives a target frame from a function unit connected thereto, that is, from the automated driving ECU 111C, and selectively outputs the received target frame to the transfer management unit 20 in the relay device 100B.

When the target frame received from the transfer control unit 10 is a communication setting frame, the transfer management unit 20 in the relay device 100B stores, in the target frame, position information, that is, port information and the ID of the relay device 100B. The transfer management unit 20 stores the position information in the target frame, and outputs the target frame having the position information stored therein, to the transfer control unit 10.

Upon receiving the target frame having the position information stored therein from the transfer management unit 20, the transfer control unit 10 in the relay device 100B transmits the received target frame to a destination function unit, e.g., vehicle speed sensor 111A, via the relay device 100A.

A storage unit 113 in each in-vehicle ECU 111 according to Modification 2 has, stored therein, an addition permission table for each relay device 100.

The vehicle speed sensor 111A receives a target frame from the automated driving ECU 111C via the relay devices 100A and 100B, refers to an ID stored in the target frame, and acquires, from the storage unit 113, the addition permission table corresponding to the relay device 100B indicated by the ID. Then, on the basis of the acquired addition permission table and the port information stored in the received target frame, the vehicle speed sensor 111A determines whether or not to perform a process for establishing communication connection with the automated driving ECU 111C.

[Other Modifications]

In the relay device 100 according to the embodiment of the present disclosure, the transfer control unit 10 is configured to output place information, i.e., port information, to the transfer management unit 20. However, the present disclosure is not limited thereto. The transfer control unit 10 may be configured not to output port information to the transfer management unit 20. In this case, the transfer management unit 20 stores, in a target frame, the ID of the relay device 100 as position information and it does not store port information in the target frame.

In this case, a function unit having received the target frame from the relay device 100 determines whether or not to perform a process for a service related to the target frame, depending on which relay device 100 the function unit as a transmission source of the target frame is connected to.

In the relay device 100 according to the embodiment of the present disclosure, the transfer management unit 20 is configured to store, in a target frame, port information and the ID of the relay device 100. However, the present disclosure is not limited thereto. For example, in the in-vehicle network 12 shown in FIG. 1 in which the in-vehicle communication system 300 includes one relay device 100, the transfer management unit 20 may store port information as position information in a target frame while it does not store the ID of the relay device 100 in the target frame.

Incidentally, a technology capable of more efficiently performing a relay process in an in-vehicle network is desired.

For example, in recent years, an in-vehicle network in which service-oriented communication is introduced has been promoted. A technology capable of, on the basis of topology of function units performing such service-oriented communication, adjusting the amount of communication between the function units and improving security of communication between the function units, at reduced cost, is desired.

Meanwhile, in the relay device according to the embodiment of the present disclosure, the transfer control unit 10 performs a relay process for a frame transmitted and received between function units. The transfer control unit 10 receives, from a function unit, a target frame which is transmitted and received according to a predetermined communication protocol and includes information with which a request source of a service is identifiable and information with which the content of the requested service is identifiable, and the transfer control unit 10 outputs the received target frame to the transfer management unit 20. When the content of the target frame received from the transfer control unit 10 satisfies a predetermined condition, the transfer management unit 20 stores, in the target frame, position information which is information regarding a position, in the in-vehicle network 12, of a function unit as a request source of a service related to the target frame or a function unit as a request destination of the service related to the target frame, and the transfer management unit 20 outputs the target frame having the position information stored therein, to the transfer control unit 10. The transfer control unit 10 transmits the target frame received from the transfer management unit 20, to a function unit which is a destination of the target frame.

In the in-vehicle communication system 300 according to the embodiment of the present disclosure, the relay device 100 performs a relay process for a frame transmitted and received between function units. Each function unit transmits, to the relay device, a target frame which is transmitted and received according to a predetermined communication protocol and includes information with which a request source of a service is identifiable and information with which the content of the requested service is identifiable. When the content of the target frame received from the function unit satisfies a predetermined condition, the relay device stores, in the target frame, position information which is information regarding a position, in the in-vehicle network 12, of a function unit as a request source of a service related to the target frame or a function unit as a request destination of the service related to the target frame, and the relay device transmits the target frame having the position information stored therein, to another function unit different from the function unit that has transmitted the target frame to the relay device 100. On the basis of the position information stored in the target frame received from the relay device, the other function unit determines whether or not to perform a process for a service related to the target frame.

An in-vehicle communication method according to the embodiment of the present disclosure is a method performed by a relay device which is used in an in-vehicle network including a plurality of function units and performs a relay process for a frame transmitted and received between the function units. In the in-vehicle communication method, firstly, the relay device receives, from a function unit, a target frame which is transmitted and received according to a predetermined communication protocol and includes information with which a request source of a service is identifiable and information with which the content of the requested service is identifiable. Next, when the content of the received target frame satisfies a predetermined condition, the relay device stores, in the target frame, position information which is information regarding a position, in the in-vehicle network 12, of a function unit as a request source of a service related to the target frame or a function unit as a request destination of the service related to the target frame. Next, the relay device transmits the target frame having the position information stored therein, to a function unit which is a destination of the target frame.

An in-vehicle communication method according to the embodiment of the present disclosure is a method used in an in-vehicle communication system including a plurality of function units, and a relay device which performs a relay process for a frame transmitted and received between the function units in the in-vehicle network 12. In the in-vehicle communication method, firstly, a function unit transmits, to the relay device, a target frame which is transmitted and received according to a predetermined communication protocol and includes information with which a request source of a service is identifiable and information with which the content of the requested service is identifiable. Next, when the content of the target frame received from the function unit satisfies a predetermined condition, the relay device stores, in the target frame, position information which is information regarding a position, in the in-vehicle network 12, of a function unit as a request source of a service related to the target frame or a function unit as a request destination of the service related to the target frame, and the relay device transmits the target frame having the position information stored therein, to another function unit different from the function unit that has transmitted the target frame to the relay device 100. On the basis of the position information stored in the target frame received from the relay device, the other function unit determines whether or not to perform a process for a service related to the target frame.

According to the configuration or method for transmitting a target frame having position information stored therein to another function unit, on the basis of the position of a function unit, in the in-vehicle network 12, which has been difficult to be specified in the communication protocol, it is possible to determine propriety of establishment of communication connection between the function unit and the other function unit, and determine the amount of communication between the function unit and the other function unit.

Therefore, in the relay device, the in-vehicle communication system, and the in-vehicle communication method according to the embodiment of the present disclosure, the relay process in the in-vehicle network can be performed more efficiently.

The disclosed embodiments are merely illustrative in all aspects and should not be recognized as being restrictive.

The scope of the present disclosure is defined by the scope of the claims rather than by the description above, and is intended to include meaning equivalent to the scope of the claims and all modifications within the scope.

The above description includes the features in the additional notes below.

[Additional Note 1]

A relay device used in an in-vehicle network including a plurality of function units, including:
- a transfer control unit configured to perform a relay process for a frame transmitted and received between the function units; and
- a transfer management unit, wherein
- the transfer control unit
  - receives, from a function unit, a target frame which is transmitted and received according to a predetermined communication protocol and includes information with which a request source of a service is identifiable and information with which a content of the requested service is identifiable, and
  - outputs the received target frame to the transfer management unit,
- when the target frame received from the transfer control unit is a communication setting frame which is a frame for establishing communication connection with another function unit, the transfer management unit
  - stores, in the target frame, position information which is information regarding a position, in the in-vehicle network, of a function unit as a request source of a service related to the target frame or a function unit as a request destination of the service related to the target frame, and
  - outputs the target frame having the position information stored therein, to the transfer control unit, and
- the transfer control unit transmits the target frame received from the transfer management unit, to a destination function unit.

[Additional Note 2]

An in-vehicle communication system including:
- a plurality of function units; and
- a relay device configured to perform a relay process for a frame transmitted and received between the function units, wherein
- each function unit transmits, to the relay device, a target frame which is transmitted and received according to a predetermined communication protocol and includes information with which a request source of a service is identifiable and information with which a content of the requested service is identifiable,
- when a content of the target frame received from the function unit satisfies a predetermined condition, the relay device
  - stores, in the target frame, position information which is information regarding a position, in the in-vehicle network, of a function unit as a request source of a service related to the target frame or a function unit as a request destination of the service related to the target frame, and
  - transmits the target frame having the position information stored therein, to another function unit different from the function unit that has transmitted the target frame to the relay device, and
- the other function unit determines whether or not to perform a process for establishing communication connection with the function unit as a transmission source of the target frame, on the basis of the position information stored in the target frame received from the relay device.

[Additional Note 3]

A relay device which includes a processor and a semiconductor integrated circuit, and is used in an in-vehicle network including a plurality of function units,
- the semiconductor integrated circuit implementing a transfer control unit configured to perform a relay process for a frame transmitted and received between the function units,
- the processor implementing a transfer management unit, wherein
- the transfer control unit
  - receives, from a function unit, a target frame which is transmitted and received according to a predetermined communication protocol and includes information with which a request source of a service is identifiable and information with which a content of the requested service is identifiable, and
  - outputs the received target frame to the transfer management unit,
- when a content of the target frame received from the transfer control unit satisfies a predetermined condition, the transfer management unit
  - stores, in the target frame, position information which is information regarding a position, in the in-vehicle network, of a function unit as a request source of a service related to the target frame or a function unit as a request destination of the service related to the target frame, and
  - outputs the target frame having the position information stored therein, to the transfer control unit, and
- the transfer control unit transmits the target frame received from the transfer management unit, to a function unit which is a destination of the target frame.

[Additional Note 4]

An in-vehicle communication system including:
- a plurality of in-vehicle ECUs; and
- a relay device configured to perform a relay process for a frame transmitted and received between the in-vehicle ECUs, wherein
- each in-vehicle ECU transmits, to the relay device, a target frame which is transmitted and received according to a predetermined communication protocol and includes information with which a request source of a service is identifiable and information with which a content of the requested service is identifiable,
- when a content of the target frame received from the in-vehicle ECU satisfies a predetermined condition, the relay device
  - stores, in the target frame, position information which is information regarding a position, in the in-vehicle network, of an in-vehicle ECU as a request source of a service related to the target frame or an in-vehicle ECU as a request destination of the service related to the target frame, and
  - transmits the target frame having the position information stored therein, to another in-vehicle ECU different from the in-vehicle ECU that has transmitted the target frame to the relay device, and
- on the basis of the position information stored in the target frame received from the relay device, the other in-vehicle ECU determines whether or not to perform a process for a service related to the target frame.

REFERENCE SIGNS LIST 1 vehicle
10 transfer control unit

11 Ethernet cable
12 in-vehicle network
13 communication port
20 transfer management unit
30 storage unit
40 processing unit
100 relay device
101 relay device
111A vehicle speed sensor (in-vehicle ECU)
111B engine ECU (in-vehicle ECU)
111C automated driving ECU (in-vehicle ECU)
112 application
113 storage unit
300 in-vehicle communication system
301 in-vehicle communication system

The invention claimed is:

1. A relay device used in an in-vehicle network including a plurality of function units, the relay device comprising:
circuitry configured to perform a relay process for a frame transmitted and received between the function units; and
a processor, wherein
the circuitry
receives, from a function unit, a target frame which is transmitted and received according to a predetermined communication protocol and includes information with which a request source of a service is identifiable and information with which a content of the requested service is identifiable, and
outputs the received target frame to the processor,
when a content of the target frame received from the circuitry satisfies a predetermined condition, the processor
stores, in the target frame, port information indicating a communication port through which the received target frame has been transmitted, among a plurality of communication ports in the relay device, and
outputs the target frame having the port information stored therein, to the circuitry, and
the circuitry transmits the target frame received from the processor, to the function unit which is a destination of the target frame.

2. An in-vehicle communication system comprising:
a plurality of function units; and
a relay device comprising circuitry configured to perform a relay process for a frame transmitted and received between the function units in an in-vehicle network, wherein
each function unit transmits, to the relay device, a target frame which is transmitted and received according to a predetermined communication protocol and includes information with which a request source of a service is identifiable and information with which a content of the requested service is identifiable,
when a content of the target frame received from the function unit satisfies a predetermined condition, the relay device
stores, in the target frame, port information indicating a communication port through which the received target frame has been transmitted, among a plurality of communication ports in the relay device, and
transmits the target frame having the port information stored therein, to another function unit different from the function unit that has transmitted the target frame to the relay device, and
the other function unit determines whether or not to perform a process for a service related to the target frame, on the basis of the port information stored in the target frame received from the relay device.

3. An in-vehicle communication method performed by a relay device comprising circuitry which is used in an in-vehicle network including a plurality of function units and performs a relay process for a frame transmitted and received between the function units, the method comprising:
receiving, from a function unit, a target frame which is transmitted and received according to a predetermined communication protocol, and includes information with which a request source of a service is identifiable and information with which a content of the requested service is identifiable;
when a content of the received target frame satisfies a predetermined condition, storing, in the target frame, port information indicating a communication port through which the received target frame has been transmitted, among a plurality of communication ports in the relay device; and
transmitting the target frame having the port information stored therein, to a function unit which is a destination of the target frame.

4. A non-transitory computer-readable storage medium having, stored therein, a computer program to be used in a relay device used in an in-vehicle network including a plurality of function units, the computer program being for causing a computer to function as:
circuitry configured to perform a relay process for a frame transmitted and received between the function units; and
a processor, wherein
the circuitry
receives, from a function unit, a target frame which is transmitted and received according to a predetermined communication protocol and includes information with which a request source of a service is identifiable and information with which a content of the requested service is identifiable, and
outputs the received target frame to the processor,
when a content of the target frame received from the circuitry satisfies a predetermined condition, the processor
stores, in the target frame, port information indicating a communication port through which the received target frame has been transmitted, among a plurality of communication ports in the relay device, and
outputs the target frame having the port information stored therein, to the circuitry, and
the circuitry transmits the target frame received from the processor, to a function unit which is a destination of the target frame.

* * * * *